(12) United States Patent  
Droux et al.

(10) Patent No.: US 8,996,756 B2  
(45) Date of Patent: Mar. 31, 2015

(54) USING PROCESS LOCATION TO BIND IO RESOURCES ON NUMA ARCHITECTURES

(75) Inventors: Nicolas G. Droux, Rio Rancho, NM (US); Rajagopal Kunhappan, Fremont, CA (US); Sherman Pun, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 972 days.

(21) Appl. No.: 13/076,735

(22) Filed: Mar. 31, 2011

(65) Prior Publication Data

US 2012/0072622 A1 Mar. 22, 2012

Related U.S. Application Data

(60) Provisional application No. 61/384,120, filed on Sep. 17, 2010.

(51) Int. Cl.
 *G06F 13/12* (2006.01)
 *G06F 9/46* (2006.01)
 *G06F 13/40* (2006.01)
 *G06F 9/50* (2006.01)

(52) U.S. Cl.
 CPC ............ *G06F 13/4022* (2013.01); *G06F 9/505* (2013.01)
 USPC ............................................ 710/36; 718/104

(58) Field of Classification Search
 CPC ..................................... G06F 9/46; G06F 9/52
 USPC .......................................................... 710/36
 See application file for complete search history.

(56) References Cited

U.S. PATENT DOCUMENTS

| | | |
|---|---|---|
| 6,026,425 A | 2/2000 | Suguri et al. |
| 6,434,656 B1 | 8/2002 | Downer et al. |
| 6,769,017 B1 * | 7/2004 | Bhat et al. ..................... 709/214 |
| 7,755,778 B2 | 7/2010 | Rai et al. |
| 7,793,301 B2 | 9/2010 | Bhat et al. |
| 2001/0016915 A1 | 8/2001 | Sugano et al. |
| 2003/0110280 A1 | 6/2003 | Hinchliffe et al. |
| 2004/0117540 A1 | 6/2004 | Hahn et al. |

(Continued)

FOREIGN PATENT DOCUMENTS

EP 0822494 A2 2/1998

OTHER PUBLICATIONS

International Search Report for PCT/US2011/050747 dated Nov. 24, 2011 (5 pages).

(Continued)

*Primary Examiner* — Titus Wong  
(74) *Attorney, Agent, or Firm* — Osha • Liang LLP

(57) ABSTRACT

In general, in one aspect, the invention relates to a method for binding input/output (I/O) objects to nodes. The method includes receiving a request to use an I/O device from a process, determining a resource to service the request, generating a first I/O object corresponding to the resource, wherein the first I/O object is unbound, and generating a proc object, wherein the proc object comprises a reference to the process requesting to use the I/O device. The method also includes sending the first I/O object and the proc object to a Non-Uniform Memory Access (NUMA) I/O Framework, determining that the process is executing on a first NUMA node, selecting the first NUMA, binding the first I/O object to the first NUMA node, and servicing the request by processing, on the first NUMA node, the resource corresponding to the first I/O object.

20 Claims, 15 Drawing Sheets

(56) References Cited

U.S. PATENT DOCUMENTS

| | | |
|---|---|---|
| 2004/0194098 A1 | 9/2004 | Chung et al. |
| 2004/0216114 A1 | 10/2004 | Lin |
| 2005/0091383 A1 | 4/2005 | Bender et al. |
| 2005/0149953 A1 | 7/2005 | Limprecht et al. |
| 2005/0177833 A1 | 8/2005 | Sauermann |
| 2005/0262091 A1 | 11/2005 | Marvin et al. |
| 2006/0122972 A1 | 6/2006 | Keohane et al. |
| 2006/0206489 A1 | 9/2006 | Finnie et al. |
| 2008/0092138 A1* | 4/2008 | Chung et al. ............ 718/100 |
| 2008/0216087 A1 | 9/2008 | Dillenberger et al. |
| 2008/0294832 A1 | 11/2008 | Muppirala et al. |
| 2009/0187915 A1 | 7/2009 | Chew et al. |
| 2009/0307699 A1 | 12/2009 | Munshi et al. |
| 2009/0307704 A1 | 12/2009 | Munshi et al. |
| 2010/0138540 A1 | 6/2010 | Tanaka et al. |
| 2011/0131328 A1 | 6/2011 | Horman et al. |
| 2011/0276984 A1 | 11/2011 | Wagner |

OTHER PUBLICATIONS

Written Opinion for International Application No. PCT/US2011/050747 dated Nov. 24, 2011 (7 pages).
Sunay Tripathi, Nicolas Droux, Thirumalai Srinivasan, Kais Belgaied "CrossBow: From Hardware Virtualized NICs to Virtualized Networks" Solaris Kernel Networking, Barcelona Spain, Aug. 17, 2009 (9 pages).
International Search Report for PCT/US2011/050746 dated Nov. 24, 2011 (5 pages).
Written Opinion for International Application No. PCT/US2011/050746 dated Nov. 24, 2011 (7 pages).
International Search Report for PCT/US2011/049852 dated Nov. 24, 2011 (5 pages).
Written Opinion for International Application No. PCT/US2011/049852 dated Nov. 24, 2011 (7 pages).
International Search Report for PCT/US2011/050748 dated Nov. 24, 2011 (5 pages).
Written Opinion for International Application No. PCT/US2011/050748 dated Nov. 24, 2011 (8 pages).
Office Action in corresponding U.S. Appl. No. 13/076,720 dated Feb. 1, 2013 (30 pages).
International Preliminary Report on Patentability for PCT/US2011/050746 dated Mar. 28, 2013 (7 pages).
International Preliminary Report on Patentability for PCT/US2011/050747 dated Mar. 28, 2013 (7 pages).
International Preliminary Report on Patentability for PCT/US2011/050748 dated Mar. 28, 2013 (8 pages).
International Preliminary Report on Patentabilityfor PCT/US2011/049852 dated Mar. 28, 2013 (7 pages).
Office Action in corresponding U.S. Appl. No. 13/076,746 dated Apr. 22, 2013 (32 pages).
Office Action in corresponding U.S. Appl. No. 13/076,715 dated May 1, 2013 (31 pages).
US 6,021,479, 02/2000, Stevens (withdrawn)

* cited by examiner

USING PROCESS LOCATION TO BIND IO RESOURCES ON NUMA ARCHITECTURES

CROSS-REFERENCE TO RELATED APPLICATIONS

Pursuant to 35 U.S.C. §119(e), this application claims benefit of U.S. Provisional Application No. 61/384,120 filed on Sep. 17, 2010, entitled "NUMA I/O Framework." The disclosure of this U.S. Provisional Application is incorporated herein by reference in its entirety.

BACKGROUND

Some modern computing system architectures utilize physically and conceptually separated nodes to leverage the speed of computing hardware. In such architectures, input/output devices may be located in various physical locations on the computer. Each input/output device may be used by different applications and processes on the separate nodes. Kernel elements executing on such architectures may be responsible for facilitating communication between an input/output device and an application which is physically remote from that device.

SUMMARY

In general, in one aspect, the invention relates to a computer readable medium including software instructions, which when executed by a processor perform a method. The method includes receiving, by an I/O (input output) Subsystem, a request to use an I/O device from a process, determining, by the I/O Subsystem, a resource to service the request, generating, by the I/O Subsystem, a first I/O object corresponding to the resource, wherein the first I/O object is unbound, and generating, by the I/O Subsystem, a proc object, wherein the proc object comprises a reference to the process requesting to use the I/O device. The method also includes sending, by the I/O Subsystem, the first I/O object and the proc object to a Non-Uniform Memory Access (NUMA) I/O Framework, determining, by the NUMA I/O Framework using the proc object that the process is executing on a first NUMA node, selecting, by the NUMA I/O Framework, the first NUMA node based on the determination that the process is executing on the first NUMA node, binding, by the NUMA I/O Framework based on the selecting, the first I/O object to the first NUMA node, and servicing the request by processing, on the first NUMA node, the resource corresponding to the first I/O object.

In general, in one aspect, the invention relates to a system. The system includes a plurality of Non-Uniform Memory Access (NUMA) nodes including a first NUMA node comprising a first processor and a first memory. The system also includes an I/O device group including an I/O device. The system also includes an I/O Subsystem executing on at least one of the plurality of NUMA nodes, configured to receive a request to use the I/O device from a process executing on the first NUMA node, generate a proc object comprising a reference to the process requesting to use the I/O device, determine a first resource necessary to service the request, and generate a first I/O object corresponding to the first resource wherein the first I/O object is unbound. The system also includes a NUMA I/O Framework executing on at least one of the plurality of NUMA nodes, configured to receive the first I/O object from the I/O Subsystem, receive the proc object from the I/O Subsystem, determine, using the proc object, that the process is executing on the first NUMA node, select the first NUMA node based on the determination that the process is executing on the first NUMA node, and bind the first I/O object to the first NUMA node, wherein the request is serviced by processing, on the first NUMA node, the first resource corresponding to the first I/O object.

In general, in one aspect, the invention relates to a method for binding I/O objects to nodes. The method includes receiving, by a network stack, a request to create a connection to an I/O device from a process, determining, by the network stack, a thread to service the request; generating, by the network stack, a first I/O object corresponding to the thread, wherein the first I/O object is unbound, and generating, by the network stack, a proc object, wherein the proc object comprises a reference to the process sending the request to create the connection. The method further includes sending, by the network stack, the first I/O object and the proc object to a Non-Uniform Memory Access (NUMA) I/O Framework, determining, by the NUMA I/O Framework using the proc object, that the process is executing on a first NUMA node of a plurality of NUMA nodes, selecting, by the NUMA I/O Framework, the first NUMA node based on the determination that the process is executing on the first NUMA node, binding, by the NUMA I/O Framework based on the selecting, the first I/O object to the first NUMA node, and servicing the connection by executing, on the first NUMA node, the thread corresponding to the first I/O object.

DETAILED DESCRIPTION

Figure 1:
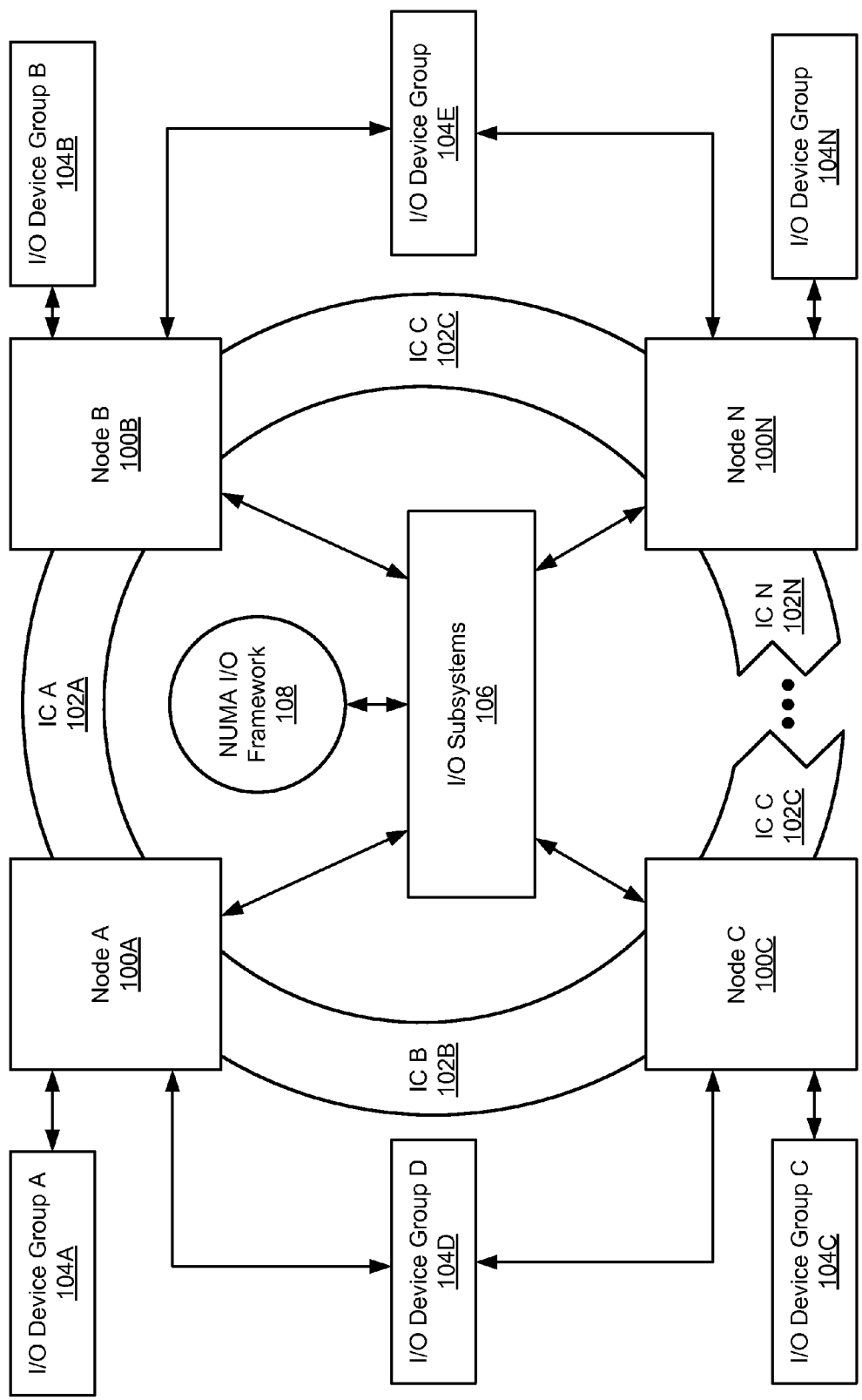
FIG. 1 shows a system in accordance with one or more embodiments of the invention.

Exemplary embodiments of the invention will be described with reference to the accompanying drawings. Like items in the drawings are shown with the same reference numbers. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a framework for managing input/output (I/O) resources on a system with a non-uniform memory access (NUMA) architecture. More specifically, embodiments of the invention relate to a method and system for dynamically placing and reassigning I/O resources to NUMA nodes.

FIG. 1 shows a system in accordance with one embodiment of the invention. As shown in FIG. 1, the system includes Node A (100A), Node B (100B), Node C (100C), and Node N (100N). Each Node (Node A (100A), Node B (100B), Node C (100C), and Node N (100N)) is operatively connected to one or more other Nodes via an interconnect (IC) (IC A (102A), IC B (102B), IC C (102C), IC N (102N)). Each Node (Node A (100A), Node B (100B), Node C (100C), and Node N (100N)) is also operatively connected to one or more I/O Device Groups (I/O Device Group A (104A), I/O Device Group D (104D), I/O Device Group C (104C), I/O Device Group B (104B), I/O Device Group E (104E), I/O Device Group N (104N)) (see FIG. 3). The system further includes I/O Subsystems (106) and NUMA I/O Framework (108). In one or more embodiments of the invention, the system architecture depicted in FIG. 1 may operate as a system with NUMA architecture. In one or more embodiments of the invention, the ICs (IC A (102A), IC B (102B), IC C (102C), IC N (102N)) may be implemented as a computer bus or data link capable of transferring data between nodes on a NUMA architecture system.

In one or more embodiments of the invention, I/O Subsystems (106) (also referred to as I/O Frameworks) provide an abstraction layer between system processes and the various system I/O functions. Specifically, I/O Subsystems (106) may exercise an amount of control over how the software entities utilizing the framework communicate with each other, and may include mechanisms to further other system goals (e.g., power management, consumer priority, etc.). Examples of I/O Subsystems (e.g., I/O Subsystems (106)) include, but are not limited to, a storage stack, a network stack, InfiniBand ULP (InfiniBand is a registered trademark of the InfiniBand Trade Association), and a Network MAC Layer.

In one or more embodiments of the invention, each I/O Subsystem receives requests from other software entities to use or access its associated I/O device. In one or more embodiments of the invention, each I/O Subsystem includes the functionality to manage the I/O resources necessary to service the requests. The I/O managed resources may include, for example, threads, interrupts, and software receive rings. In addition, the I/O Subsystems (106) may manage its associated resources by initializing an I/O Object corresponding to the managed resource. (see FIG. 8). Further, the I/O resources managed by one or more I/O Subsystems (106) may exist or execute on a single Node (e.g., Node A (100A)), on multiple Nodes (e.g., Node A (100A) and Node B (100B)), or on all Nodes within a single system. Each of the I/O Subsystems (106) may also execute on a single Node (e.g., Node A (100A)), on multiple Nodes (e.g., Node A (100A) and Node B (100B)), or on all Nodes within a single system. Accordingly, the I/O Subsystems (106) and the NUMA I/O Framework (108) are depicted in FIG. 1 as external to the other elements on the system for illustrative purposes.

In one or more embodiments of the invention, the NUMA I/O Framework (108) is an abstraction layer between the I/O Subsystems (106) and the underlying NUMA architecture (e.g., the system depicted in FIG. 1). The NUMA I/O Framework (108) assumes all responsibility for determining where and how I/O Objects (e.g., references to I/O resources) are processed. Specifically, the NUMA I/O Framework manages the physical location of the I/O resources managed by the I/O Subsystems (106). In one or more embodiments of the invention, the NUMA I/O Framework determines the placement of an I/O Object using information-gathering modules or policies implemented to further system goals (see FIGS. 4-7).

In one or more embodiments of the invention, the NUMA I/O Framework (108) binds the I/O resource to one or more nodes on the system. Binding an I/O resource to a node may include notifying a kernel scheduler that the instructions associated with the I/O resource are to be executed on the node or nodes to which it is bound. In one or more embodiments of the invention, once an I/O resource is bound to a node or nodes (e.g., via an I/O Object), the instructions or messages originating from that I/O resource are scheduled for execution on the node to which it is bound until there is further intervention by the NUMA I/O Framework (108). In one embodiment of the invention, an I/O resource may be bound to a subset of nodes (e.g., via an I/O Object). The NUMA I/O Framework (108) may provide the kernel scheduler information about the subset of nodes as part of binding the I/O resource. The kernel scheduler may then choose which one of the subset of nodes on which the instructions or messages are scheduled for execution.

Figure 2:
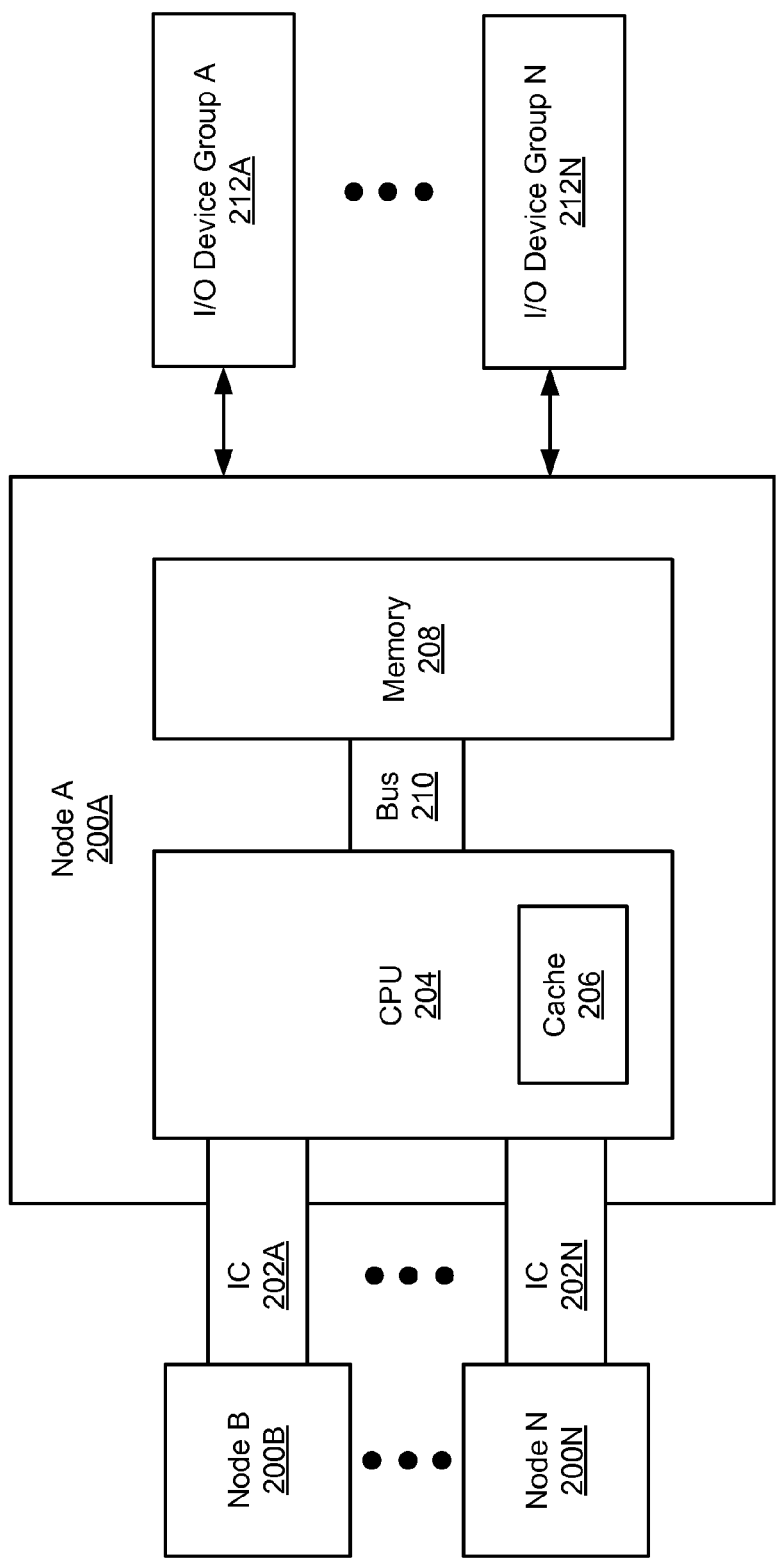
FIG. 2 shows a NUMA node in accordance with one or more embodiments of the invention.

FIG. 2 shows a node in accordance with one embodiment of the invention. As shown in FIG. 2, Node A (200A) is operatively connected to Node B (200B) and Node N (200N) via the ICs (IC A (202A), IC N (202N)). Node A (200A) includes a central processing unit (CPU) (204) and Cache (206) connected to a memory (208), via a Bus (210). Each of the other nodes in the system (Node B (200B), Node N (200C)) may include substantially similar elements as those depicted in Node A (200A).

In one or more embodiments of the invention, the memory (208) includes local application memory and local kernel memory. A portion of the local kernel memory may be allocated for use by system-wide software elements (e.g., I/O Subsystems, NUMA I/O Framework, etc.). In one embodiment of the invention, the memory (208) is under the control of a memory manager specific to the CPU (204) on Node A (200A), and the memory of Node B (200B) (not shown) is under the control of a memory manager specific to the CPU of Node B (200B)(not shown). Said another way, the above-described architecture may operate more efficiently than an architecture where all CPUs are competing for memory from a single memory manager. Other embodiments of the invention may be implemented on system architectures other than those described above.

In one or more embodiments of the invention, processes and other instruction sets executed on Node A (200A) using the CPU (204) and memory (208) may be received with varying frequency. For example, if a node has the ability to process 10 instructions per second, but is receiving only 5 instructions every second, then the node is said to be under-utilized. If the same node instead receives 12 instructions every second, then the node is said to be over-utilized. A node's I/O load capacity refers to the quantification of the amount of additional instructions that the node can process without become over-utilized (e.g., an under-utilized node would have a high I/O load capacity relative to the total processing ability of the node).

In one or more embodiments of the invention, each node (Node A (200A), Node B (200B), Node N (200B)) may be operatively connected to one or more I/O Device Groups. As depicted in FIG. 2, Node A (200A) is operatively connected to one or more I/O Device Groups (IO Device Group A (212A), I/O Device Group N (212N)). In one embodiment of the invention, one or more of the I/O Device Groups (e.g., I/O Device Group A (212A), I/O Device Group N (212N)) may be connected to one or more nodes via an IC.

In one or more embodiments of the invention, a NUMA node may include a CPU (e.g., CPU (204)), and not include memory. Alternatively, in one embodiment of the invention, a NUMA node may include a memory (e.g., memory (208)) but not include a CPU.

Figure 3:
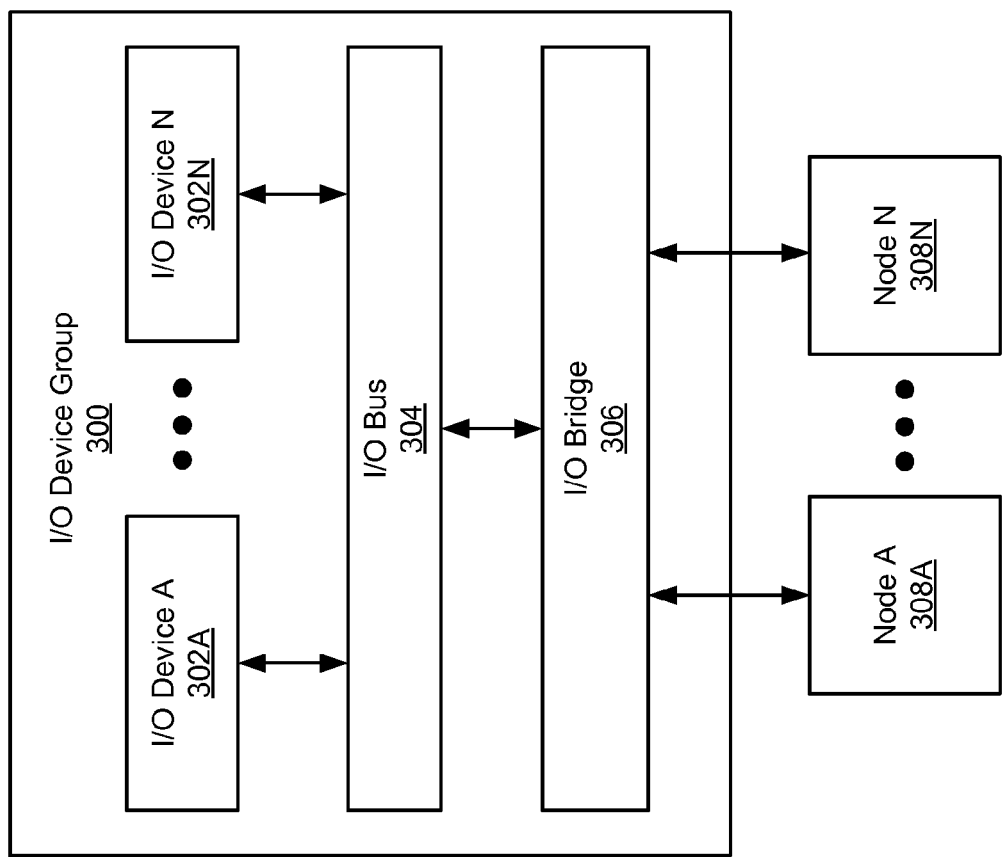
FIG. 3 shows an I/O Device Group in accordance with one or more embodiments of the invention.

FIG. 3 shows an I/O Device Group in accordance with one embodiment of the invention. As shown in FIG. 3, the I/O Device Group (300) includes one or more I/O devices (IO Device A (302A), I/O Device N (302N)) operatively connected to I/O Bus (304), which is, in turn, operatively connected to I/O Bridge (306). I/O Bridge (306) is operatively connected to one or more nodes (Node A (308A), Node N (308N)) (e.g., Node A (100A) in FIG. 1).

In one embodiment of the invention, the I/O devices (IO Device A (302A), I/O Device N (302N) refer to resources connected to the computer system, which may be used by programs executing on the system for information input and/or information output. Examples of such devices may include, but are not limited to, disk drives, network interface cards, printers, Universal Serial Buses (USBs), etc. One of ordinary skill in the art will appreciate there are other I/O devices not listed here.

Figure 4:
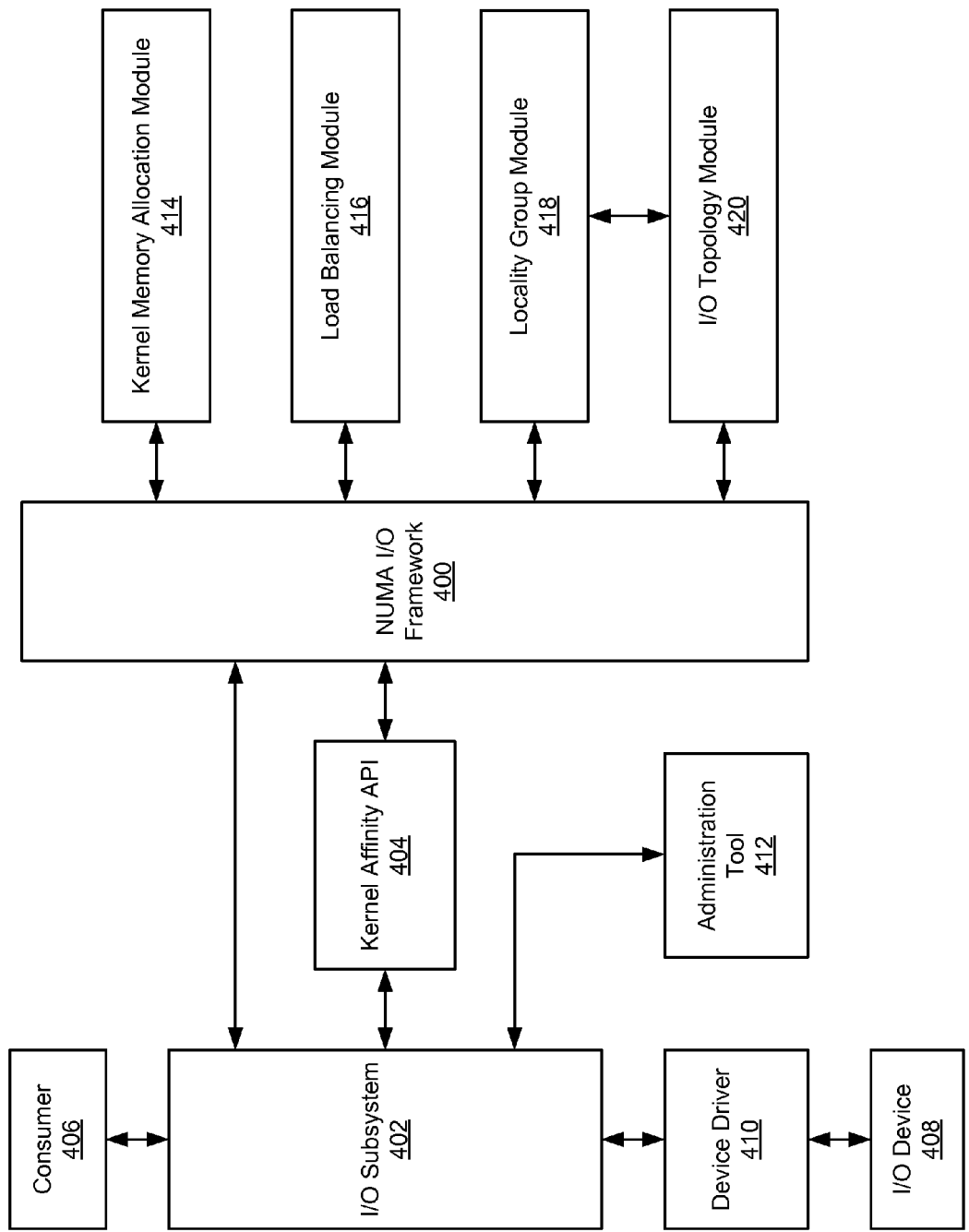
FIG. 4 shows a system in accordance with one or more embodiments of the invention.

FIG. 4 shows a system in accordance with one embodiment of the invention. Specifically, FIG. 4 shows the interaction between software entities executing on one or more nodes (e.g., Node A (200A), Node B (200B), and Node N (200N) in FIG. 1) of a system in accordance with one embodiment of the invention. As shown in FIG. 4, the system includes the NUMA I/O Framework (400), which communicates with the I/O Subsystem (402) directly, or via the Kernel Affinity API (404). The I/O Subsystem (402) facilitates communication between the Consumer (406) and the I/O Device (408) (via the Device Driver (410)). The I/O Subsystem may also receive I/O Object constrains or restriction information from the Administration Tool (412).

In one or more embodiments of the invention, the NUMA I/O Framework (400) utilizes a number of specialized modules to perform specific tasks and gather information. These modules include the NUMA Kernel Memory Allocation Module (414), the I/O Load Balancing Module (416), the NUMA Locality Group Module (418), and the I/O Topology Module (420). Each of these elements is described in detail below.

In one or more embodiments of the invention, the Consumers (Consumer (406)) refer to processes and programs which utilize or attempt to utilize the I/O resources of the system. Consumers may operate at the kernel level (e.g., as part of the operating system) or may operate at the user level (e.g., as part of an application). The I/O resources may include I/O Devices (e.g., I/O Device (408)), processing resources (e.g., CPU (204) and memory (208) in FIG. 2), as well as other system elements which facilitate communication between a process and an I/O Device (e.g., interrupts, receive rings, listeners, etc.), and may include physical or virtual elements.

In one or more embodiments of the invention, the I/O Subsystem (402) manages the I/O resources necessary to service requests to access the I/O Device (408) received from a Consumer (406). Such requests may include calls to open a connection to the I/O Device (408), or to establish a data link via the appropriate I/O Subsystem (402). The I/O Subsystem (402) may also include the functionality to initialize or instantiate an I/O Object, and associate the I/O Object with an I/O resource. Specifically, the I/O Subsystem (402) may create an I/O Object which includes a reference to an I/O resource, which may then be provided to the NUMA I/O Framework (400) as part of a request to bind an I/O resource (see FIG. 8).

In one embodiment of the invention, the NUMA I/O Framework (400) receives I/O Objects from the I/O Subsystem (402). The I/O Objects may be received via the Kernel Affinity API (404), which provides an interface for the I/O Subsystem (402) to register I/O Objects with the NUMA I/O Framework (400). Further, I/O Objects registered with the NUMA I/O Framework (400) may include information regarding the grouping of the I/O Objects, an affinity between the I/O Objects, and any constraints associated with the I/O Objects. The NUMA I/O Framework (400) uses the affinity to determine an appropriate node or nodes to an I/O Object should be bound. (e.g., nodes that are physically close to one another, nodes that are physically close to a specified I/O Device, etc.). In one or more embodiments of the invention, I/O Objects are sent to the NUMA I/O Framework (400) in one or more I/O Object Groups (see FIG. 8).

In one embodiment of the invention, the NUMA I/O Framework (400) binds the I/O Objects to nodes. In one embodiment of the invention, binding an I/O Object refers to assigning the tasks issued by the I/O resource referenced by the I/O Object (e.g., handling an interrupt, executing a thread) to one or more nodes on the system. In one or more embodiments of the invention, the NUMA I/O Framework (400) uses the information within the I/O Object (e.g., affinity), along with information from and functionality of other modules on system to accomplish the binding. The Load Balancing Module (416), the Locality Group Module (418), and the I/O Topology Module (420) are discussed below with regard to FIGS. 5, 6, and 7, respectively. In one embodiment of the invention, the NUMA I/O Framework (400) may bind I/O Objects according to one or more objectives. For example, the NUMA I/O Framework (400) may bind I/O Objects in order to maximize the performance of the entire system. Alternatively, the NUMA I/O Framework (400) may bind I/O Objects in a manner which makes the most efficient use of system resources. The NUMA I/O Framework (400) may also bind I/O Objects to maximize the speed at which one or all processes are executed. The NUMA I/O Framework (400) may bind I/O Objects in a manner which minimizes the distance between the I/O Devices being used, and the Node bound to the associated I/O Objects.

In one or more embodiments of the invention, Kernel Memory Allocation Module (414) allows the NUMA I/O Framework (400) to allocate kernel memory from any of the attached nodes (e.g., from memory (208) in Node A (200A) in FIG. 2). In one embodiment of the invention, the Load Balancing Module (416) monitors the amount of work performed by each node. This information is used by the NUMA I/O Framework to dynamically balance the work between nodes, taking into account resource management and I/O Topology (i.e., the location of the nodes relative to one another). In one embodiment of the invention, the amount of work or rate of processing done by a system node is referred to as the node's I/O load.

Figure 5:
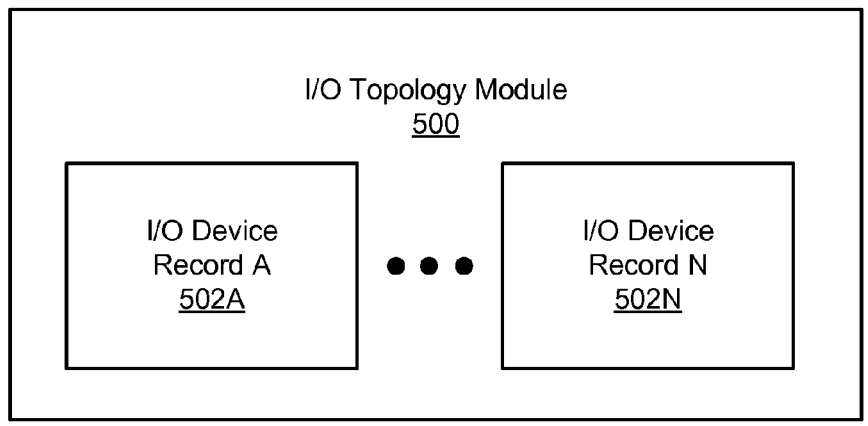
FIG. 5 shows an I/O Topology Module in accordance with one or more embodiments of the invention.

FIG. 5 shows an I/O Topology Module in accordance with one embodiment of the invention. As shown in FIG. 5, the I/O Topology Module (500) includes one or more I/O Device Records (I/O Device Record A (502A), I/O Device Record N (502N)). The I/O Topology Module (500) uses information gathered from the I/O Subsystems (e.g., I/O Subsystem (402) in FIG. 4) to create an I/O Device Record for each I/O Device on the system (e.g., I/O Device (408) in FIG. 4). Each I/O Device Record (e.g., I/O Device Record A (502A), I/O Device Record N (502N)) includes information indicating which system nodes are directly connected to the I/O Device. Alternatively, in one or more embodiments of the invention, the I/O Device Record is created and maintained by other kernel elements on the system accessible by the I/O Topology Module (500). Information regarding the location of each I/O Device on the system may be referred to as the I/O Topology.

In one or more embodiments of the invention, the I/O Topology Module (500) includes the functionality to respond to queries by the NUMA I/O Framework such that for a given I/O Device, the I/O Topology Module (500) returns the node or nodes directly connected to that I/O Device. In one embodiment of the invention, these nodes are referred to as the Preferred Nodes.

Figure 6:
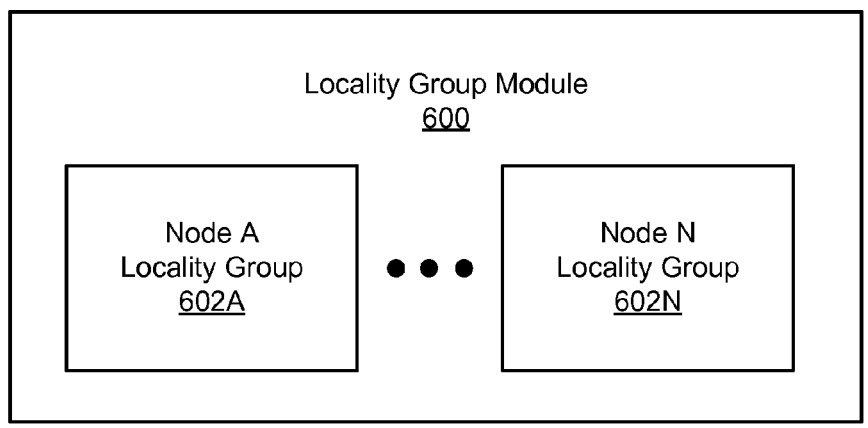
FIG. 6 shows a Locality Group Module in accordance with one or more embodiments of the invention.

FIG. 6 shows a Locality Group Module in accordance with one embodiment of the invention. As shown in FIG. 6, the Locality Group Module (600) includes one or more Locality Groups (e.g., Node A Locality Group (602A), Node N Locality Group (602N)). Each Locality Group maintains information about a node on the system. This information may include the location of the node relative to the other nodes on the system (i.e., which nodes are directly adjacent to the node). Information regarding the location of each node on the system may be referred to as the NUMA Topology. In one embodiment of the invention, the distance between Nodes or I/O Devices refers to the physical distance between the two elements. In one embodiment of the invention, the distance may refer to the number of Nodes between the two elements (also referred to as hops). Further, in one embodiment of the invention, the distance between nodes may be expressed in terms of the time necessary for data to travel from one node to another (also referred to as the latency between nodes).

In one or more embodiments of the invention, the Locality Group Module (600) includes the functionality to respond to queries by the NUMA I/O Framework such that for a given Node, the Locality Group Module (600) returns the node or nodes directly connected to that Node. In one embodiment of the invention, these nodes are referred to as the Preferred Nodes.

Figure 7:
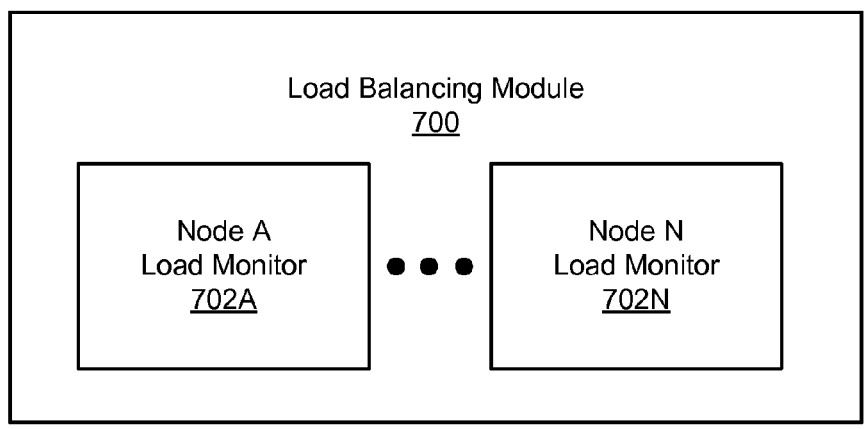
FIG. 7 shows a Load Balancing Module in accordance with one or more embodiments of the invention.

FIG. 7 shows a Load Balancing Module in accordance with one embodiment of the invention. As shown in FIG. 7, the Load Balancing Module (700) includes one or more Load Monitors (e.g., Node A Load Monitor (702A), Node N Load Monitor (702N)). Each Load Monitor (e.g., Node A Load Monitor (702A), Node N Load Monitor (702N)) maintains information about the utilization and I/O load capacity of the corresponding node (e.g., CPU utilization, memory utilization, etc.). Specifically, each Load Monitor (e.g., Node A Load Monitor (702A), Node N Load Monitor (702N)) obtains periodic measurements of specified metrics (e.g., CPU utilization, memory utilization, etc.), and uses the measurements to calculate an I/O load for the node. In one embodiment of the invention, the I/O load includes indicators reflective of trending direction of the measured metrics (e.g., increasing CPU utilization over the last 10 cycles). Further, in one embodiment of the invention, each Load Monitor (e.g., Node A Load Monitor (702A), Node N Load Monitor (702N)) includes functionality to track metrics over time and detect patterns in the I/O load (e.g., CPU utilization is greatest on Monday afternoons between 2 pm and 5 pm). The I/O load is also used to calculate a node I/O load capacity.

Figure 8:
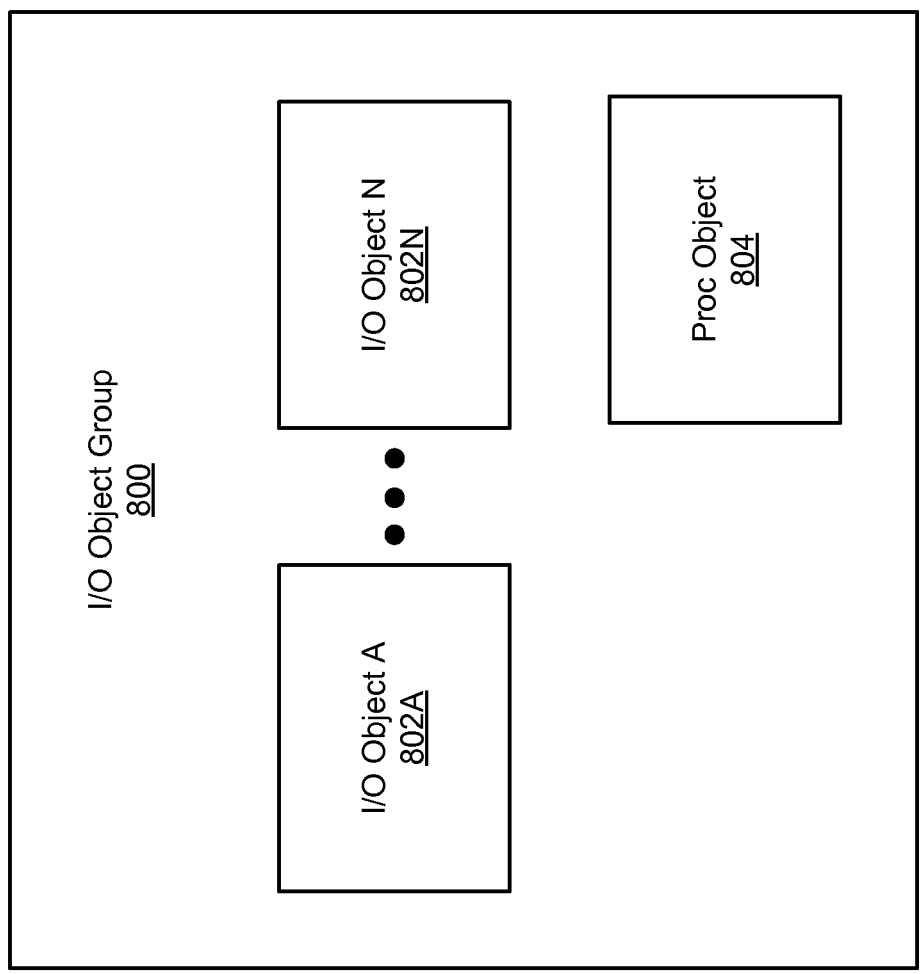
FIG. 8 shows an I/O Object Group in accordance with one or more embodiments of the invention.

FIG. 8 shows an I/O Object Group in accordance with one embodiment of the invention. As shown in FIG. 8 the I/O Object Group (800) includes one or more I/O Objects (e.g., I/O Object A (802A), I/O Object N (802N)) and a Proc Object (804). In one or more embodiments of the invention, an I/O Object is a software construct which encapsulates a reference or handle to a corresponding I/O resource. Each I/O Object may also include one or more affinities with other I/O Objects, a constraint on the binding of the I/O object, and a Dedicate CPU Flag.

In one or more embodiments of the invention, a Proc Object (e.g., Proc Object (804)) is a software construct which encapsulates a reference to the process or application from which the I/O Subsystem receives the request. In one embodiment of the invention, the process or application corresponding to the Proc Object (804) is bound to a node before the I/O Subsystem creates or initializes the Proc Object (804). In one embodiment of the invention, the Proc Object (804) is used by the I/O Subsystem and the NUMA I/O Framework to maintain location information about the process or application whose request is being serviced by the I/O Objects (e.g., I/O Object A (802A), I/O Object N (802N)) in the I/O Object Group (800).

In one or more embodiments of the invention, the Proc Object (804) includes an identifier for the corresponding process. In one embodiment of the invention, the NUMA I/O Framework may reassign or rebind some or all of the I/O Objects (e.g., I/O Object A (802A), I/O Object N (802N)) in an I/O Object Group (800). Once this occurs, the NUMA I/O Framework may pass this identifier to the kernel scheduler and notify the kernel scheduler that the process corresponding the Proc Object (804) should also be reassigned to the same NUMA node or nodes as the other I/O Objects.

In one or more embodiments of the invention, each time one or more of the I/O Objects in an I/O Object Group are reassigned or rebound to a different NUMA node, the NUMA I/O Framework determines whether to notify the kernel scheduler that the process corresponding the Proc Object (804) should also be reassigned. In one embodiment of the invention, this determination is made based on a process reassignment policy. The process reassignment policy may, for example, dictate that when the number of reassigned I/O Objects in an I/O Object Group exceeds a threshold, the kernel scheduler should be instructed to reassign the process corresponding to the Proc Object in that I/O Object Group. Alternatively, the process reassignment policy may dictate that when a predetermined percentage of the I/O Object Aggregate Load is executed on a NUMA node that is not also executing the process corresponding to the Proc Object, the kernel scheduler should be instructed to reassign the process to that NUMA node. Those skilled in the art will appreciate that the invention is not limited to the process reassignment policies listed above.

In one or more embodiments of the invention, an affinity is a scalar indication of the strength of the relationship between I/O Objects (e.g., no relationship, weak relationship, strong relationship, negative relationship, etc.), and between the I/O Objects (e.g., I/O Object A (802A), I/O Object N (802N)) and the Proc Object (e.g., Proc Object (804)). The affinity between two I/O Objects (I/O Object A (802A), I/O Object N (802N)) or between an I/O Object (e.g., I/O Object A (802A), I/O Object N (802N)) and the Proc Object (e.g., Proc Object (804)) defines the maximum or minimum permitted distance between the nodes to which the two Objects may or should be bound. In one or more embodiments of the invention, the affinity is specified by the I/O Subsystem managing the I/O Object (e.g., I/O Object A (802A), I/O Object N (802N)) and the Proc Object (e.g., Proc Object (804)).

In one or more embodiments of the invention, the I/O Subsystem creates an affinity between I/O Objects (e.g., I/O Object A (802A), I/O Object N (802N)) corresponding to I/O resources which work together to perform part of an I/O operation. For example, an I/O Object corresponding to an interrupt for traffic received by a virtual network interface card may have a strong affinity to other I/O Objects corresponding to other interrupts and threads processing data on the same virtual network interface card.

In one or more embodiments of the invention, the I/O Subsystem creates an affinity between an I/O Objects (e.g., I/O Object A (802A), I/O Object N (802N)) and the Proc Object (804) in order to specify the proximity between the node processing the I/O resource corresponding to the I/O Object (e.g., I/O Object A (802A), I/O Object N (802N)) and the node processing the process or application corresponding to the Proc Object (804). For example, an I/O Subsystem creating a connection may specify that interrupts for the connection should be processed on the same node as the process that requested the connection, and that all other I/O Objects in the I/O Object Group may be bound to any adjacent node. In this example, the I/O Subsystem would specify a strong affinity between the Proc Object and the I/O Objects corresponding to interrupts, and a weaker affinity between the Proc Object and other I/O Objects in the I/O Object Group.

In one or more embodiments of the invention, a constraint may specify a node or group of nodes upon which an I/O Object or I/O Object Group must be bound. A constraint may be used to confine an I/O Object or I/O Object Group to an approved or appropriate set of nodes. Constraints may be used to isolate one I/O Object or I/O Object Group from another. In one or more embodiments of the invention, constraints may be used by the I/O Subsystem to enforce the separation of zones or containers on a system.

In one or more embodiments of the invention, a Dedicate CPU Flag may indicate that the I/O Object should be bound to a node with a CPU available to dedicate to the I/O Object. The Dedicate CPU Flag may be interpreted by the NUMA I/O Framework as an absolute restriction, or alternatively as a preference. In one embodiment of the invention, the Dedicate CPU Flag may include other information indicating a strength of the preference.

In one or more embodiments of the invention, the I/O Object includes information related to I/O load produced by the I/O resource associated with the I/O Object. Specifically, the I/O Object may include a value which represents the expected I/O load that will be imposed upon the node to which the I/O Object is bound. Alternatively, the I/O Object may include information which allows the NUMA I/O Framework to obtain the I/O load associated with the I/O Object from elsewhere on the system. Further, once the I/O object is bound to a node, the load caused by the I/O object on that node is measured. In one or more embodiments of the invention, the measured I/O load of an I/O Object is referred to as the effective I/O load or I/O object effective load. The measurement may be used to update the value representing the expected I/O load of the I/O object. In one embodiment of the invention, once the I/O object is bound, measurements are made periodically and the measurements are used to update the effective I/O load of the I/O object.

In one or more embodiments of the invention, I/O Objects may be submitted to the NUMA I/O Framework as an I/O Object Group (800). An I/O Object Group (800) may include affinities or constraints that apply to all I/O Objects within the I/O Object Group (800). In addition, in one embodiment of the invention, the NUMA I/O Framework may apply affinities or constraints inherent to all I/O Objects within an I/O Object Group (800).

Figure 9:
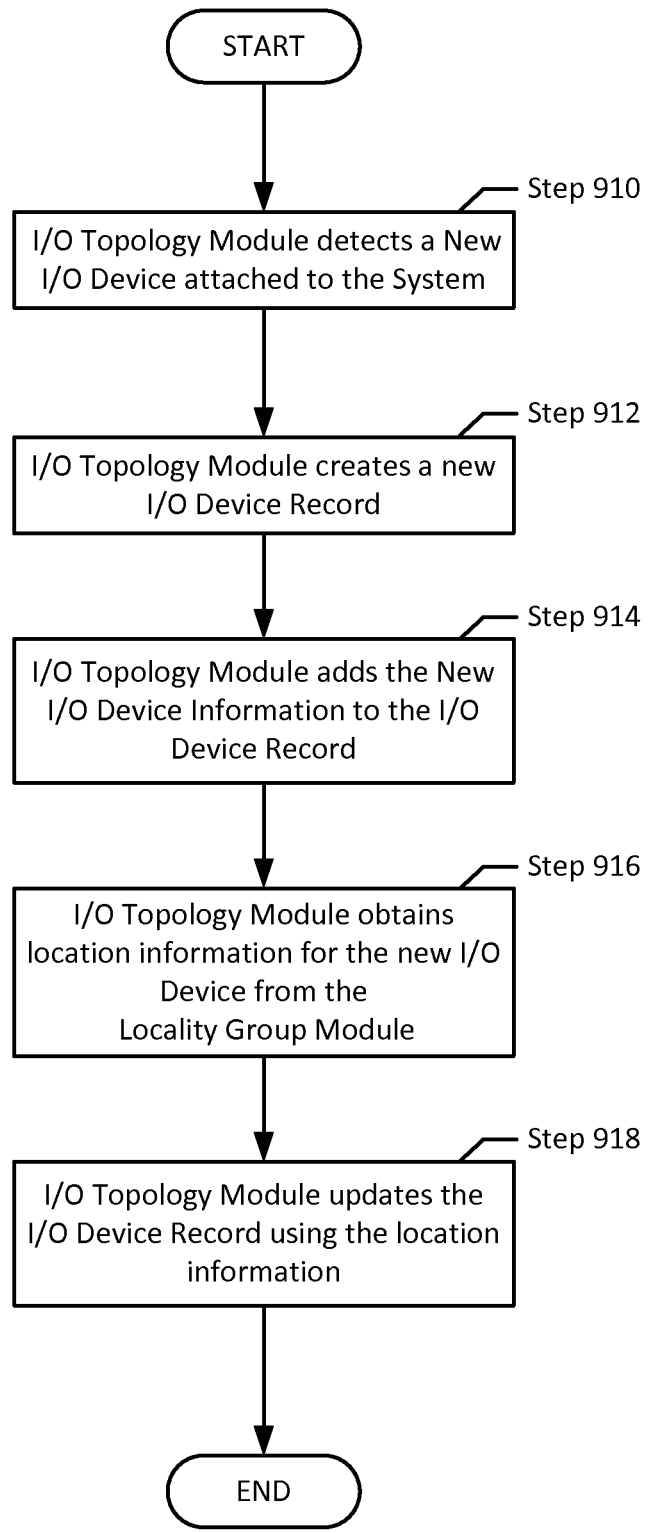
FIG. 9 shows a flowchart in accordance with one or more embodiments of the invention.

FIG. 9 shows a flow chart for registering a new I/O Device with a NUMA I/O Framework in accordance with one or more embodiments of the invention. In one or more embodiments of the invention, one or more of the steps shown in FIG. 9 may be omitted, repeated, and/or performed in a different order than that shown in FIG. 9. Accordingly, the specific arrangement of steps shown in FIG. 9 should not be construed as limiting the scope of the invention.

In Step 910, the I/O Topology Module detects the attachment of a new I/O Device to the system. In Step 912, the I/O Topology Module creates a new I/O Device Record. In Step 914, the I/O Topology Module adds the new I/O Device information to the I/O Device Record. In Step 916, the I/O Topology Module obtains location information for the new I/O Device from the Locality Group Module, or from other system resources (e.g., BIOS, machine description, etc.). This information may include the closest nodes to the I/O Device, which are not directly connected to the I/O Device. In Step 918, the I/O Topology Module updates the I/O Device Record using the location information obtained from the Locality Group Module.

Figure 10:
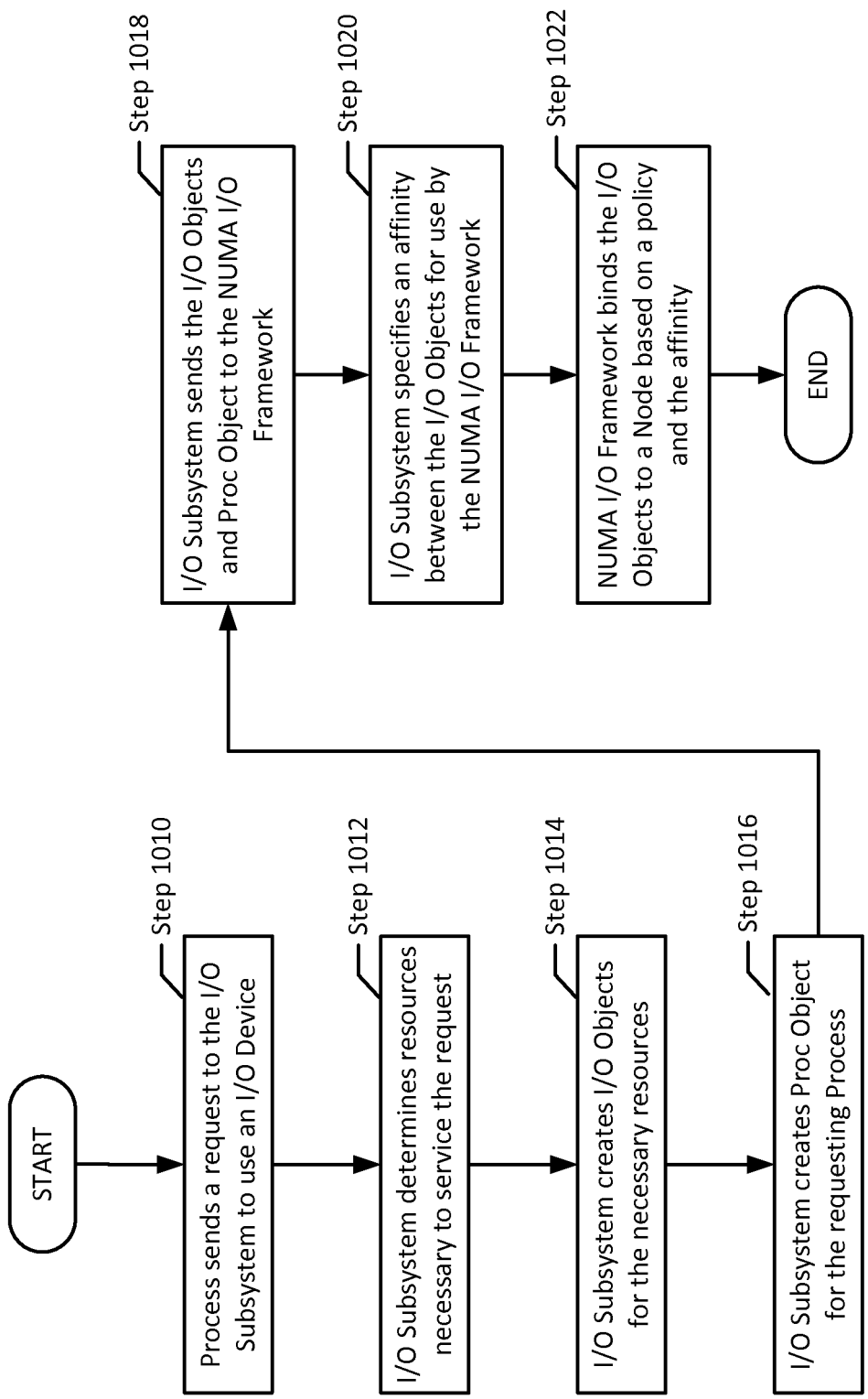
FIG. 10 shows a flowchart in accordance with one or more embodiments of the invention.

FIG. 10 shows a flow chart for servicing a request by an I/O Subsystem in accordance with one or more embodiments of the invention. In one or more embodiments of the invention, one or more of the steps shown in FIG. 10 may be omitted, repeated, and/or performed in a different order than that shown in FIG. 10. Accordingly, the specific arrangement of steps shown in FIG. 10 should not be construed as limiting the scope of the invention.

In Step 1010, a process sends a request to the I/O Subsystem to use an I/O Device. The request may be, for example, a request to create a data link associated with a network interface card so that the process may send and transmit data across a network. Alternatively, the request may be to gain access to a storage device in order to alter data located on that device. Other examples of incoming requests include requests from a network stack (e.g., to create a VNIC), and requests from a file system. In Step 1012, the I/O Subsystem determines resources necessary to service the request. This may include, for example, a specific number of threads and a specific number of interrupts. In one embodiment of the invention, this determination is based on the requirements of similar requests previously serviced. In one embodiment of the invention, the determined resources may change over time as usage information is analyzed.

For example, an I/O Subsystem which creates a connection between a process and a data storage device may be configured to create a specified number of I/O Objects for threads, and a specified number of I/O Objects for interrupts for connections of the type created. The I/O Subsystem may further be configured to specify that the threads should not execute on separate nodes, because doing so may cause an unacceptable amount of slowness or data loss for the connection. For this reason, the I/O Subsystem may express this by specifying a strong affinity between the I/O Objects.

In Step 1014, the I/O Subsystem creates I/O Objects for the necessary resources. In Step 1016, the I/O Subsystem creates a Proc Object corresponding to the process making the request. In Step 1018, the I/O Subsystem sends the I/O Objects and the Proc Object to the NUMA I/O Framework. In one embodiment of the invention, the I/O Objects are created by invoking method call of the Affinity Kernel API. In Step 1020, the I/O Subsystem specifies an affinity between the I/O Objects for use by the NUMA I/O Framework. In Step 1022, the NUMA I/O Framework binds the I/O Objects to a node based on a policy and the affinity. Step 1020 is explained in detail with regard to FIGS. 10 and 11.

Figure 11:
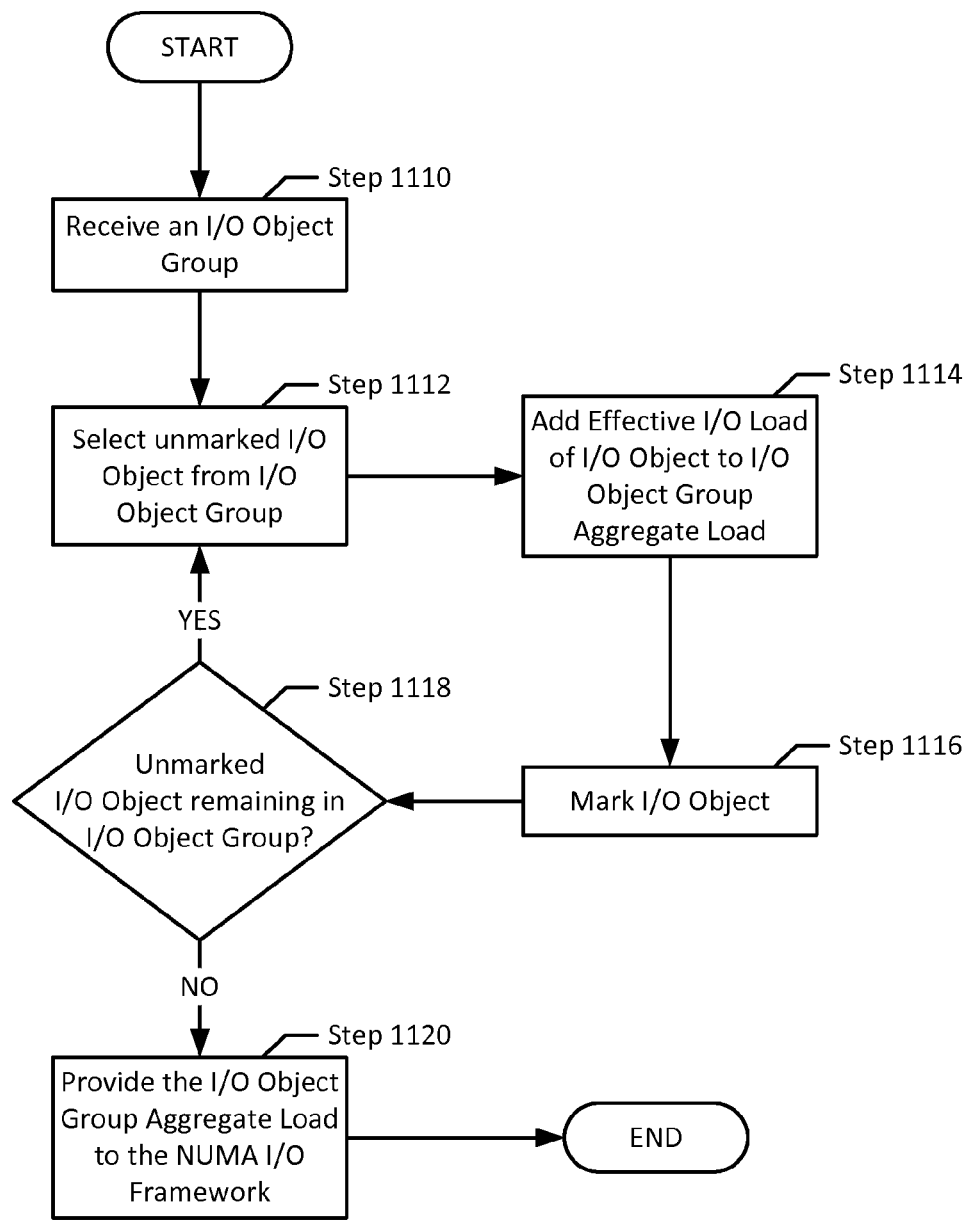
FIG. 11 shows a flowchart in accordance with one or more embodiments of the invention.

FIG. 11 shows a flow chart for determining the I/O Object Group Aggregate Load in accordance with one or more embodiments of the invention. In one or more embodiments of the invention, one or more of the steps shown in FIG. 11 may be omitted, repeated, and/or performed in a different order than that shown in FIG. 11. Accordingly, the specific arrangement of steps shown in FIG. 11 should not be construed as limiting the scope of the invention.

Although the steps discussed in regard to FIG. 11 are described as being performed by the Load Balancing Module, in one embodiment of the invention, the steps may be performed by the NUMA I/O Framework directly. In Step 1110, the Load Balancing Module receives an I/O Object Group. In Step 1112, the NUMA I/O Framework selects a first I/O Object such that the effective I/O load associated with the I/O Object has not yet been added to the I/O Object Group Aggregate Load (referred to as an unmarked I/O Object). In Step 1114, the effective I/O load of the selected I/O Object is added to the I/O Object Group Aggregate Load. In Step 1116, the selected I/O Object is marked. In one embodiment of the invention, the I/O Object is marked so that its effective I/O load will not be added to the I/O Object Group Aggregate Load more than once.

In Step 1118, the Load Balancing Module determines if any unmarked I/O Objects remain in the I/O Object Group. If at least one unmarked I/O Object remains in the I/O Object Group, the flow returns to Step 1112. If no unmarked I/O Objects remain in the I/O Object Group, then in Step 1120, Load Balancing Module provides the I/O Object Group Aggregate Load to the NUMA I/O Framework.

Figure 12:
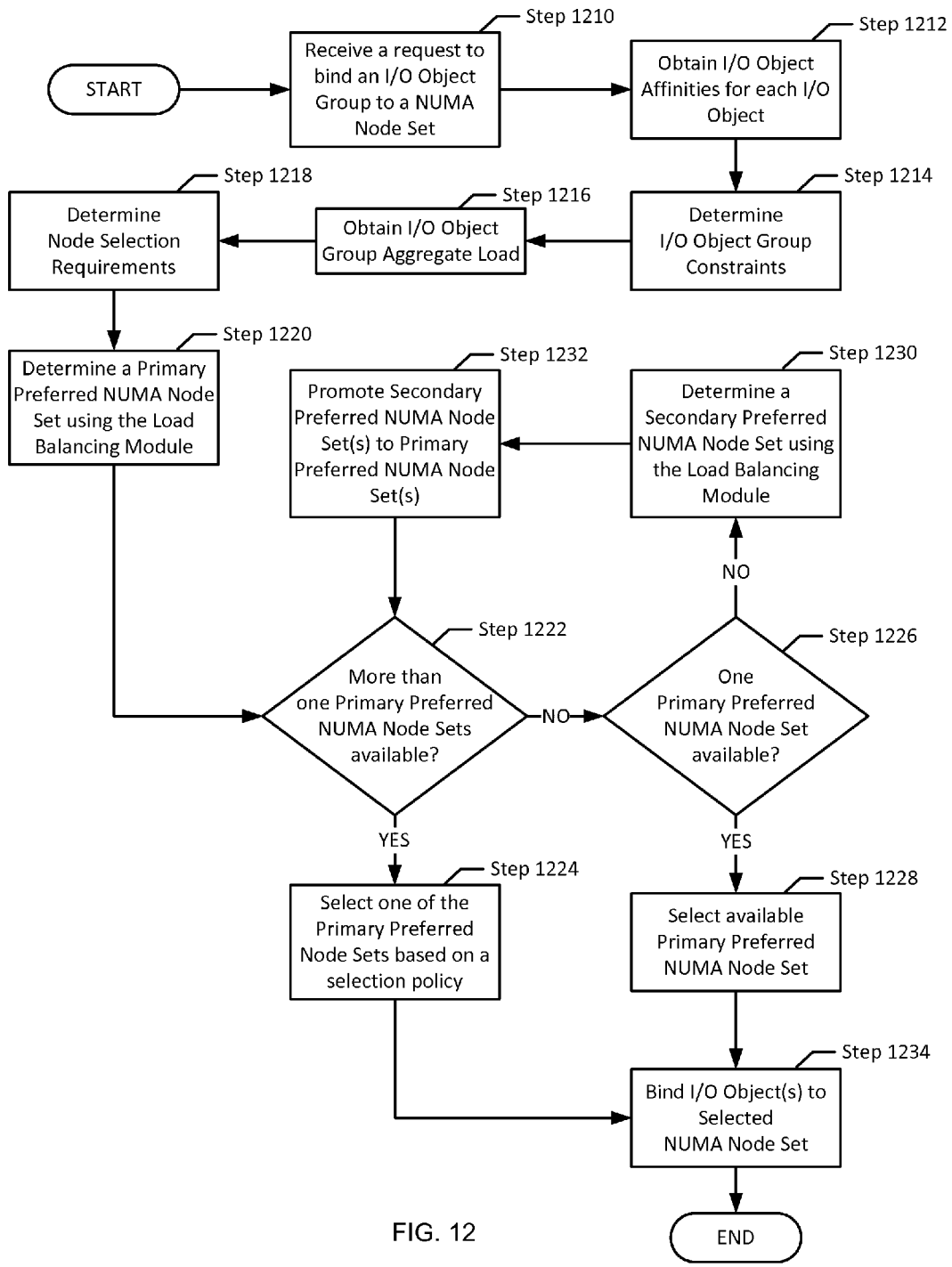
FIG. 12 shows a flowchart in accordance with one or more embodiments of the invention.

FIG. 12 shows a flow chart for binding an I/O Object by a NUMA I/O Framework in accordance with one or more embodiments of the invention. In one or more embodiments of the invention, one or more of the steps shown in FIG. 12 may be omitted, repeated, and/or performed in a different order than that shown in FIG. 12. Accordingly, the specific arrangement of steps shown in FIG. 12 should not be construed as limiting the scope of the invention.

In Step 1210, the NUMA I/O Framework receives a request to bind an I/O Object Group to a NUMA Node Set. In Step 1212, the NUMA I/O Framework obtains the I/O Object affinities for each I/O Object in the I/O Object Group, as well as the affinities between the Proc Object and I/O Objects in the Object Group. In one embodiment of the invention, an affinity is presumed between all I/O Objects, and between each I/O Object and the Proc Object in an I/O Object Group. In Step 1214, the NUMA I/O Framework determines I/O Object Group constraints. In one embodiment of the invention, the affinities and constraints are imbedded in the received I/O Object. In Step 1216, the NUMA I/O Framework obtains the I/O Object Group Aggregate Load from the Load Balancing Module.

In Step 1218, the NUMA I/O Framework determines Node Selection Requirements using the information about the I/O Object and Proc Object affinities and constraints, along with any other restrictions or indications obtained regarding the I/O Objects (including the existence of a Dedicate CPU Flag). In one embodiment of the invention, the Node Selection Requirements specify a set of conditions that a node or set of nodes must satisfy to be considered for binding the I/O Object Group. Such conditions may include a specific arrangement of nodes within a set distance from an I/O Device. In one embodiment of the invention, the conditions may include the I/O load capacity of a selected node.

In one embodiment of the invention, the Node Selection Requirements may only be satisfied by more than one node. For example, if one I/O Object in an I/O Object Group has a Dedicate CPU Flag, and no other object in the I/O Object Group may be placed on the same node, the Node Selection Requirements would necessarily require the use of more than one node. Therefore, the Node Selection Requirements may necessitate the I/O Object Group be bound to a node or combination of nodes, both of which may be referred to as a node set or set of nodes. Consequently, a node set may consist of a single node or a combination of nodes.

In one embodiment of the invention, the Node Selection Requirements for an I/O Object Group persist as long as that I/O Object Group exists. In one embodiment of the invention, the I/O load on the nodes of the system may differ such that the NUMA I/O Framework rebinds the I/O Object Group to a different node set. In such a circumstance, the node set to which the I/O Object Group is moved must also satisfy the same Node Selection Requirements.

In Step 1220, the NUMA I/O Framework uses the Load Balancing Module to determine a Primary Preferred NUMA Node Set. Specifically, the NUMA I/O Framework queries the Load Balancing Module to determine a set of nodes with an I/O load capacity at least equivalent to the I/O Object Group Aggregate Load. In one embodiment of the invention, the NUMA I/O Framework may also query the I/O Topology module to determine which of the node or nodes with the requisite I/O load capacity are closest to the I/O Device. In one embodiment of the invention, the Primary Preferred NUMA Node Sets are the node sets closest to the I/O Device that include requisite I/O load capacity. Alternatively, NUMA I/O Framework may determine the Primary Preferred NUMA Node Sets are the node sets with the highest I/O load capacity above the requisite I/O load capacity. In one embodiment of the invention, the Primary Preferred NUMA Node Sets are determined using a combination of these factors.

In Step 1222, the NUMA I/O Framework determines whether there is more than one Primary Preferred NUMA Node Set upon which the I/O Objects in the I/O Object Group may be bound. Specifically, the NUMA I/O Framework determines whether any of the Primary Preferred NUMA Node Sets satisfies the Node Selection Requirements (i.e., is available).

If there is more than one available Primary Preferred NUMA Node Set, then in Step 1224, one of the Primary Preferred NUMA Node Sets is selected based on a selection policy. In one embodiment of the invention, when there are two nodes or sets of nodes which may both equally satisfy the Node Selection Requirements, one of the satisfactory Primary Preferred NUMA Node Sets is selected according to the selection policy. In one embodiment of the invention, the selection policy dictates that the node set with the highest I/O load capacity is selected (if a variation exists). In one embodiment of the invention, the selection policy dictates that the node set closest to the I/O Device is selected (if a variation exists). In one embodiment of the invention, the selection policy specifies that one Primary Preferred NUMA Node Set is selected at random. Alternatively, the selection policy may further other system goals independent of the system goals used to determine the Primary Preferred NUMA Node Sets.

If there is not more than one Primary Preferred NUMA Node Sets available, then in Step 1226, the NUMA I/O Framework determines whether there is one Primary Preferred NUMA Node Set that satisfies the Node Selection Requirements. If there is one Primary Preferred NUMA Node Set, then in Step 1228, that Primary Preferred NUMA Node Set is selected.

If there is no Primary Preferred NUMA Node Set, then in Step 1230, the NUMA I/O Framework determines a Secondary Preferred NUMA Node Set. Specifically, the NUMA I/O Framework queries the Load Balancing Module to obtain a set of nodes with an I/O load capacity at least equivalent to the I/O Object Group Aggregate Load. From this list of nodes, the Primary Preferred Node Sets are marked as unavailable. The Secondary Preferred Node Sets are determined from the list of remaining nodes.

In one embodiment of the invention, the Secondary Preferred NUMA Node Sets are the node sets from the list of remaining nodes closest to the I/O Device that include the requisite I/O load capacity. In one embodiment of the invention, the NUMA I/O Framework may query the Locality Group Module to determine the node or nodes directly connected to the nodes closest to the I/O Device. Alternatively, NUMA I/O Framework may determine the Secondary Preferred NUMA Node Sets from the list of remaining nodes are the node sets with the highest I/O load capacity above the requisite I/O load capacity. In one embodiment of the invention, the Secondary Preferred NUMA Node Sets are determined from the list of remaining nodes using a combination of these factors. In one embodiment of the invention, if there are no Primary Preferred NUMA Node Sets available, then the system waits until one of the initially determined Primary Preferred NUMA Node Sets becomes available. In addition, if no Primary Preferred NUMA Node Sets are available, the NUMA I/O Framework may bind the I/O Object Group to a node set which does not satisfy all of the Node Selection Requirements. For example, if one I/O Object in the I/O Object Group includes a Dedicate CPU Flag, the NUMA I/O Framework may determine that all I/O Objects in the I/O Object Group may be bound to the same node, despite the existence of the Dedicate CPU Flag.

In Step 1232, the Secondary Preferred NUMA Node Set is promoted to the Primary Preferred NUMA Node Set, and the flow returns to Step 1222. Once a Primary Preferred NUMA Node Set is selected, then in Step 1234, the I/O Object or I/O Objects in the I/O Object Group is bound to the selected Primary Preferred NUMA Node Set.

Figure 13:
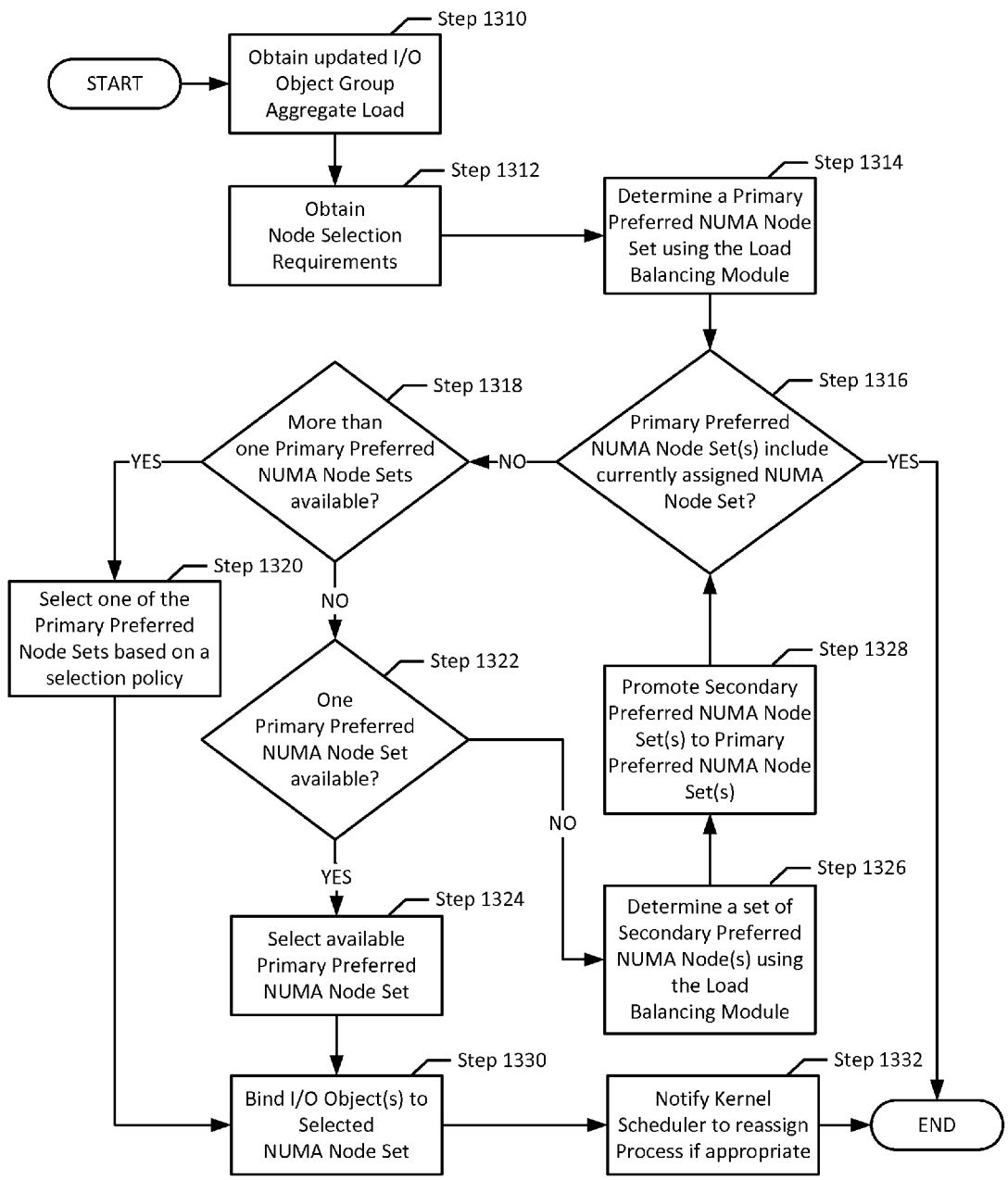
FIG. 13 shows a flowchart in accordance with one or more embodiments of the invention.

FIG. 13 shows a flow chart for binding an I/O Object by a NUMA I/O Framework in accordance with one or more embodiments of the invention. In one or more embodiments of the invention, one or more of the steps shown in FIG. 13 may be omitted, repeated, and/or performed in a different order than that shown in FIG. 13. Accordingly, the specific arrangement of steps shown in FIG. 13 should not be construed as limiting the scope of the invention.

In Step 1310, the NUMA I/O Framework obtains an updated I/O Object Group Aggregate Load from the Load Balancing Module. The updated I/O Object Group Aggregate Load may include, for example, a more recent measurement of the I/O load imposed by each I/O Object on the node to which it is bound, and a recalculation of the I/O Object Group Aggregate Load.

In Step 1312, the NUMA I/O Framework determines the Node Selection Requirements using the information about the I/O Object and Proc Object affinities and constraints, along with any other restrictions or indications obtained regarding the I/O Objects (including the existence of a Dedicate CPU Flag). In Step 1314, the NUMA I/O Framework uses the Node Selection Requirements and the Load Balancing Module to determine a Primary Preferred NUMA Node Set. Specifically, the NUMA I/O Framework queries the Load Balancing Module to determine a set of nodes with an I/O load capacity at least equivalent to the recalculated I/O Object Group Aggregate Load. In one embodiment of the invention, the NUMA I/O Framework may also query the I/O Topology module to determine which of the node or nodes with the requisite I/O load capacity are closest to the I/O Device.

In one embodiment of the invention, node set to which the I/O Object Group is currently bound is added to the list of node sets obtained from the Load Balancing Module. In one embodiment of the invention, in determining the Primary Preferred NUMA Node Sets, the node set to which the I/O Object Group is currently bound is considered as though the recalculated I/O Object Group Aggregate Load were subtracted from that node set's current I/O load. Said another way, the recalculated I/O Object Group Aggregate Load is subtracted proportionally from the total resource utilization of each node of the node set. In one embodiment of the invention, the recalculated I/O Object Group Aggregate Load is ignored for comparison purposes to prevent thrashing.

As an example, suppose the Primary Preferred NUMA Node Sets are determined as the nodes with the highest I/O load capacity among those nodes with an I/O load capacity at least equivalent to the recalculated I/O Object Group Aggregate Load. Suppose further that placing the I/O Object Group on the set of nodes has caused the resource utilization of the nodes in that node set to be relatively high compared to that of the other nodes. However, the nodes in that node set may, without the burden of the I/O Object Group, have a higher I/O load capacity than the other nodes on the system. In this case, the I/O Object Group should not be moved from its current binding.

In one embodiment of the invention, the Primary Preferred NUMA Node Sets are determined from the list of nodes obtained from the Load Balancing Module (including the currently bound node set). In one embodiment of the invention, the Primary Preferred NUMA Node Sets are the node sets closest to the I/O Device that include requisite I/O load capacity. Alternatively, NUMA I/O Framework may determine the Primary Preferred NUMA Node Sets are the node sets with the highest I/O load capacity above the requisite I/O load capacity. In one embodiment of the invention, the Primary Preferred NUMA Node Sets are determined using a combination of these factors.

In Step 1316, the NUMA I/O Framework determines whether the node set currently bound to the I/O Object Group is among the node sets determined to be Primary Preferred NUMA Node Sets. If the currently bound node set is among the Primary Preferred NUMA Node Sets, then no other node set on the system is preferred over the node set to which the I/O Object Group is currently bound, and the flow ends.

In one embodiment of the invention, although there may be other Primary Preferred NUMA Node Sets, none of those node sets has been afforded any advantage over the currently bound node set because both have been determined to be Primary Preferred NUMA Node Sets. Further, the currently bound node set has previously been determined to satisfy the Node Selection Requirements. Rebinding the I/O Object Group to a different Primary Preferred NUMA Node Set would result in no recognized advantage over maintaining the current placement.

If in Step 1316, the NUMA I/O Framework determines that currently bound node set is not among the Primary Preferred NUMA Node Sets, then in Step 1318 the NUMA I/O Framework determines whether there is more than one Primary Preferred NUMA Node Set upon which the I/O Objects in the I/O Object Group may be bound. In one embodiment of the invention, there may be more than one Primary Preferred NUMA Node Sets when more than one NUMA Node set satisfies the Node Selection Requirements and each with equivalent capacity to process the I/O Object Group Aggregate Load.

If there is more than one available Primary Preferred NUMA Node Set, then in Step 1320, one of the Primary Preferred NUMA Node Sets is selected based on the selection policy. If there is not more than one Primary Preferred NUMA Node Sets, then in Step 1322, the NUMA I/O Framework determines whether there is one Primary Preferred NUMA Node Set. If there is one Primary Preferred NUMA Node Set, then in Step 1324, that Primary Preferred NUMA Node Set is selected.

If there is no Primary Preferred NUMA Node Set, then in Step 1326, the NUMA I/O Framework determines a Secondary Preferred NUMA Node Set using the Load Balancing Module. Specifically, the NUMA I/O Framework queries the Load Balancing Module to obtain a set of nodes with an I/O load capacity at least equivalent to the I/O Object Group Aggregate Load. From this list of nodes, the Primary Preferred Node Sets are marked as unavailable. The Secondary Preferred Node Sets are determined from the list of remaining nodes.

In one embodiment of the invention, the Secondary Preferred NUMA Node Sets are the node sets from the list of remaining nodes closest to the I/O Device that include the requisite I/O load capacity. In one embodiment of the invention, the NUMA I/O Framework may query the Locality Group Module to determine the node or nodes directly connected to the nodes closest to the I/O Device. Alternatively, NUMA I/O Framework may determine the Secondary Preferred NUMA Node Sets from the list of remaining nodes are the node sets with the highest I/O load capacity above the requisite I/O load capacity. In one embodiment of the invention, the Secondary Preferred NUMA Node Sets are determined from the list of remaining nodes using a combination of these factors. In one embodiment of the invention, if there are no Primary Preferred NUMA Node Sets available, then the system waits until one of the initially determined Primary Preferred NUMA Node Sets becomes available.

In Step 1328, the Secondary Preferred NUMA Node Set is promoted to the Primary Preferred NUMA Node Set, and the flow returns to Step 1316. Once a Primary Preferred NUMA Node Set is selected, then in Step 1330, the I/O Object or I/O Objects in the I/O Object Group is bound to the selected Primary Preferred NUMA Node Set.

In Step 1332, the NUMA I/O Framework determines whether to notify the kernel scheduler that the process corresponding to the Proc Object should also be bound to the selected Primary Preferred NUMA Node Set or another NUMA node on the system. In one embodiment of the invention, this determination is made using a process reassignment policy.

Figure 14A:
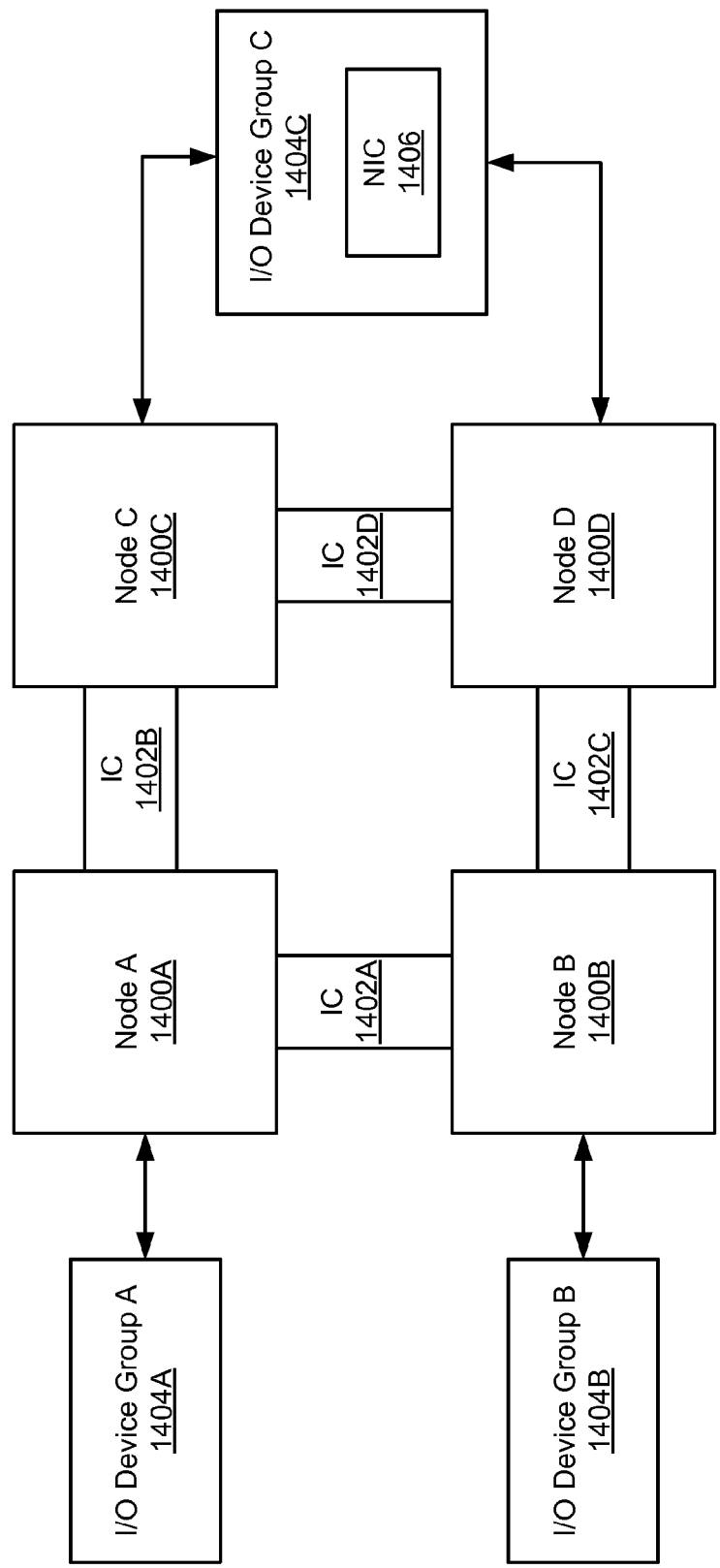
FIG. 14A shows an example system in accordance with one or more embodiments of the invention.
Figure 14B:
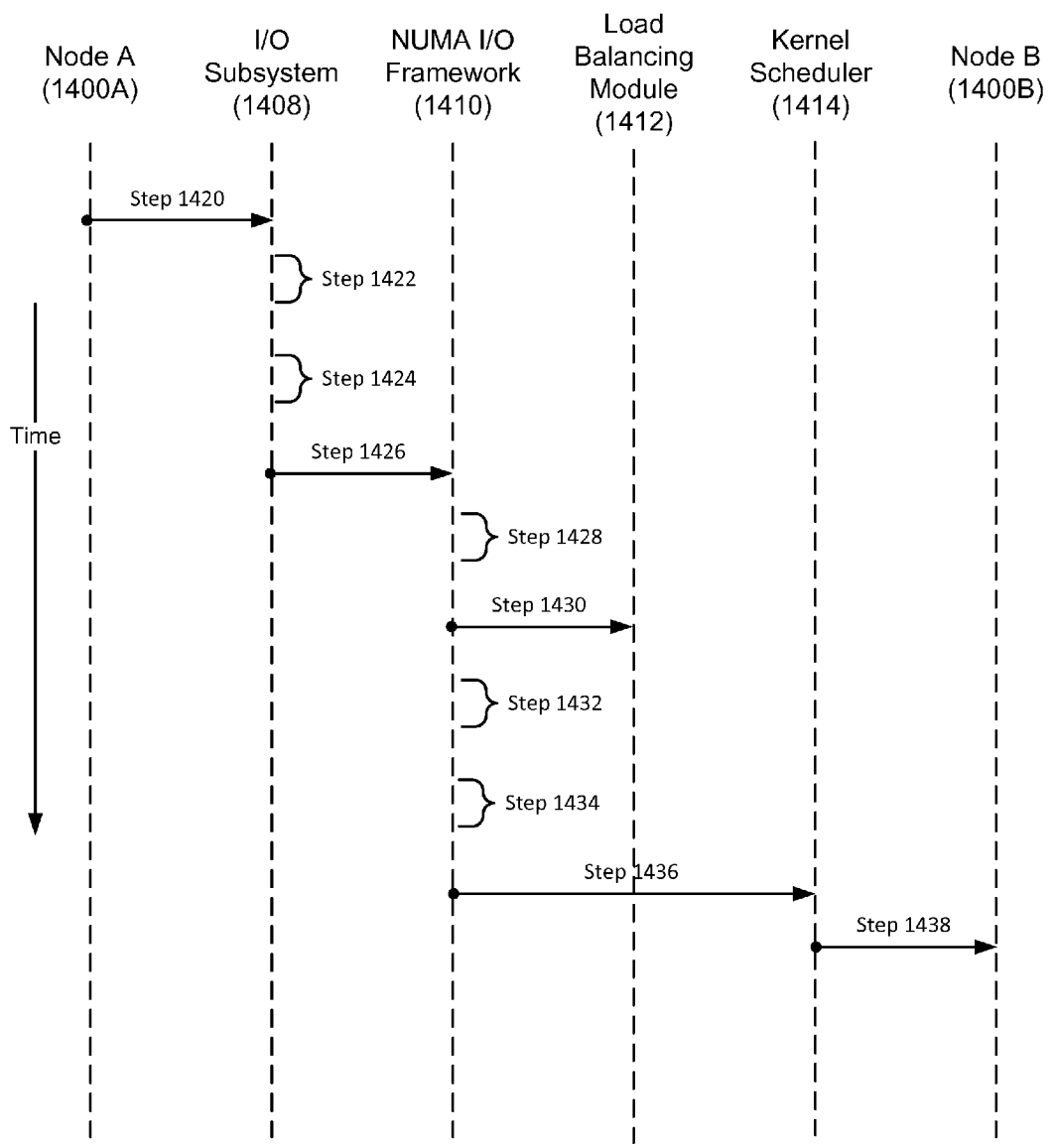
FIG. 14B shows an example timeline in accordance with one or more embodiments of the invention.
Figure 14C:
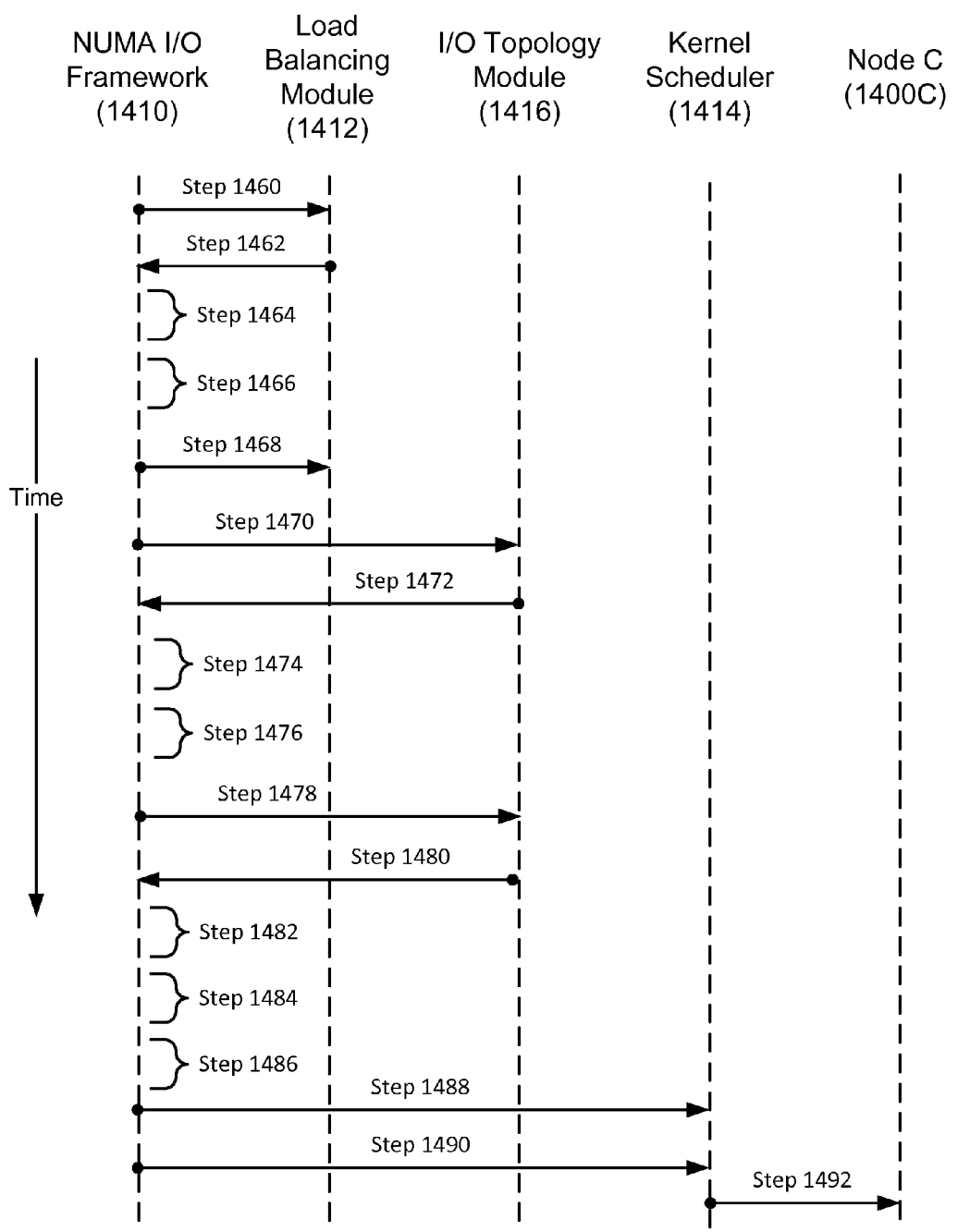
FIG. 14C shows an example timeline in accordance with one or more embodiments of the invention.
Figure 15:
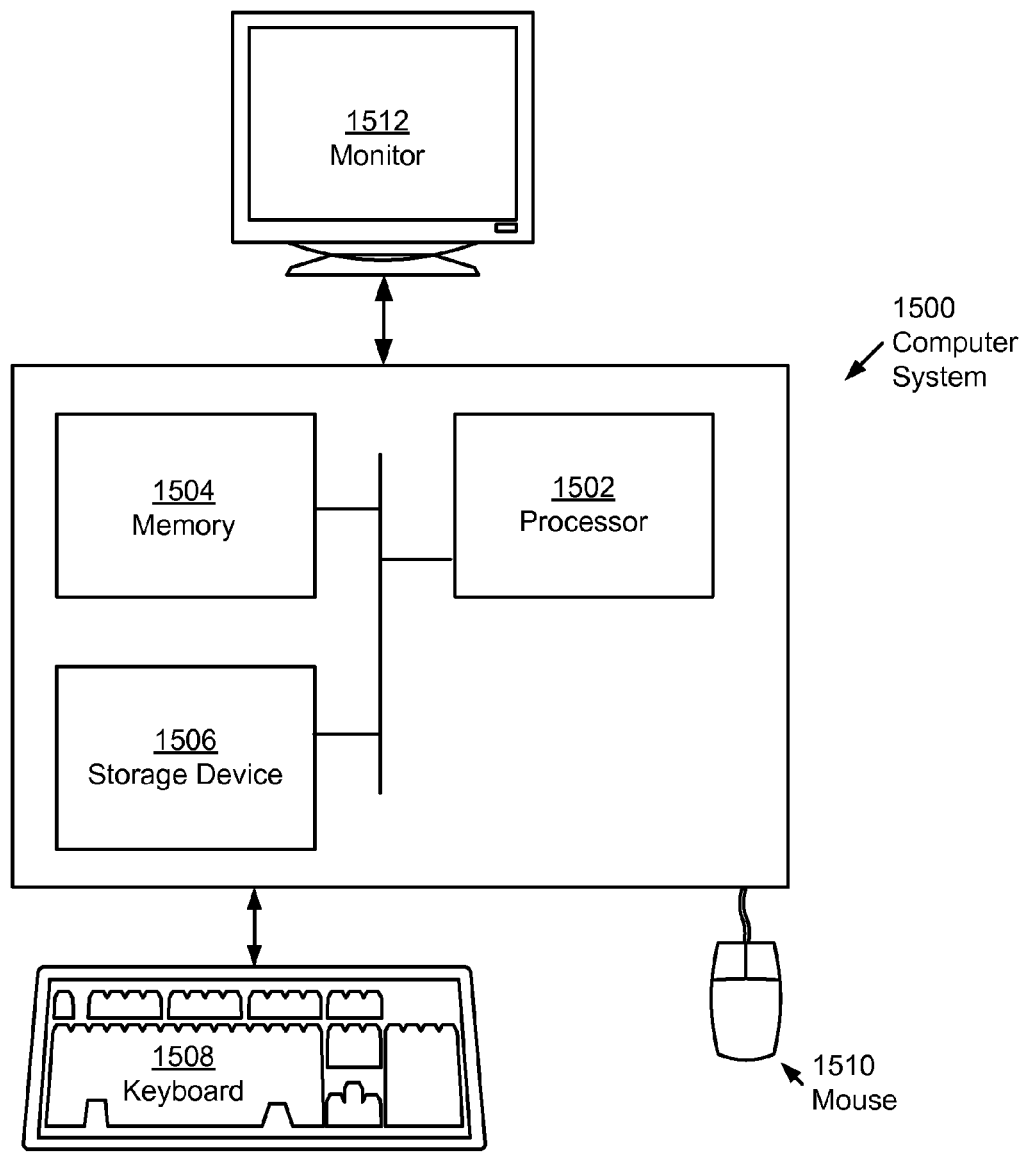
FIG. 15 shows a system in accordance with one or more embodiments of the invention.

FIGS. 14A, 14B, and 14C show an exemplary system and timeline in accordance with one embodiment of the invention. As shown in FIG. 14A, the system includes Node A (1400A), Node B (1400B), Node C (1400C), and Node D (1400D). Node A (1400A) is connected to Node B (1400B) via IC A (1402A), and to Node C (1400C) via IC B (1402B). Node B (1400B) is connected to Node A (1400A) via IC A (1402A), and to Node D (1400D) via IC C (1402C). Node C (1400C) is connected to Node A (1400A) via IC B (1402B), and to Node D (1400D) via IC D (1402D). Node D (1400D) is connected to Node B (1400B) via IC C (1402C), and to Node C (1400C) via IC D (1402D).

Continuing with the discussion of FIG. 14A, Node A (1400A) is operatively connected to I/O Device Group A (1404A), and Node B (1400B) is operatively connected to I/O Device Group B (1404B). Additionally, Node C (1400C) and Node D (1400D) are both operatively connected to I/O Device C (1404C). I/O Device C (1404C) includes a physical network interface card (NIC) (1406).

FIG. 14B shows an timeline of an exemplary interaction between the elements in FIG. 14A. Specifically, the timeline in FIG. 14B depicts a process executing on Node A requesting that a network connection be created between the process and a receiving system. For the purposes of the example, assume the receiving system is external to the exemplary system of FIG. 14A, such that a network connection requires a physical NIC. Other embodiments depicting a system establishing a network connection between two processes on the same system will not vary significantly from this example, but may involve a virtual NIC instead of a physical NIC. Further assume, for the purposes of the example, that the I/O Subsystem (1408) in FIG. 14B is a network stack responsible for establishing data transfer connections between user-level and kernel-level processes and an I/O device attached to the system.

In Step 1420, a process on Node A (1400A) sends a request to the I/O Subsystem (1408) to establish a network connection with a network destination. In Step 1422, the I/O Subsystem (1408) selects NIC (1406) for use in establishing and connection, and determines the I/O resources necessary to open a connection between the process on Node A (1400A) and NIC (1406). For the purposes of this example, assume that the I/O Subsystem determines that one thread and one interrupt are the necessary I/O resources. In Step 1424, the I/O Subsystem (1408) creates an I/O Object for the thread, and an I/O Object for the interrupt. In addition, the I/O Subsystem (1408) creates a Proc Object corresponding to the requesting process on Node A (1400). In Step 1426, the I/O Subsystem (1408) sends the I/O Objects and the Proc Object, as an I/O Group. The I/O Subsystem (1408) also specifies the affinity between the I/O Objects such that the I/O Objects should be placed on the same node, and the I/O Objects should each be placed on either the same node or an adjacent node to the Proc Object. The I/O Subsystem (1408) then notifies the NUMA I/O Framework (1410) of the affinity.

In Step 1428, the NUMA I/O Framework (1410) determines the Node Selection Requirements using the information about the I/O Object and Proc Object affinities and constraints, along with any other restrictions or indications obtained regarding the I/O Objects. In addition, the NUMA I/O Framework determines the I/O Object Group Aggregate Load from the effective I/O load of each I/O Object. For the present example, the Node Selection Requirements determined by the NUMA I/O Framework (1410) detail that the selected node must be capable of executing two I/O Objects, and must be either the same or adjacent node to the node executing the process corresponding to the Proc Object.

In Step 1430, the NUMA I/O Framework (1410) queries the Load Balancing Module (1412) to determine a set of nodes with an I/O load capacity at least equivalent to the calculated I/O Object Group Aggregate Load. For the purposes of this example, assume that the Load Balancing Module (1412) responds (not shown) that Node D (1200D) and Node B (1200B), have the requisite I/O load capacity.

The NUMA I/O Framework (1410) may also query the I/O Topology Module (not shown) to determine the node or nodes closest to NIC (1406). The I/O Topology Module (not shown) responds that Node C (1400C) and Node D (1400D) are directly connected to I/O Device Group C (1404C) and NIC (1406). For the purposes of the example, assume that the NUMA I/O Framework determines the Primary Preferred NUMA Nodes as the nodes closest to the I/O Device that have the requisite I/O load capacity. Therefore, Node D (1400D) is the only Primary Preferred Node.

In Step 1432, The NUMA I/O Framework (1410) applies the Node Selection Requirements to the Primary Preferred Node. The NUMA I/O Framework (1410) determines that Node D (1400D) is not the node on which the process corresponding to the Proc Object is located. Moreover, Node D (1400D) is also not adjacent to the node on which the process corresponding to the Proc Object is located. Therefore, the NUMA I/O Framework (1410) determines that no Primary Preferred NUMA Node Sets are available.

In Step 1434, the NUMA I/O Framework (1410) queries the Locality Group Module (1414) to determine the node or nodes closest to the Primary Preferred Nodes. The Locality Group Module (1414) responds (not shown) notifying the NUMA I/O Framework (1410) that Node A (1400A) and Node B (1400B) are directly connected to the Primary Preferred Nodes (Node C (1400C) and Node D (1400D)). The NUMA I/O Framework (1410) then determines if either of Node A (1400A) or Node B (1400B) have an I/O load capacity at least equivalent to the I/O Object Group Aggregate Load. Suppose then that both Node A (1400A) and Node B (1400B) have the requisite I/O load capacity. Therefore, Node A (1400A) and Node B (1400B) are the Secondary Preferred Nodes, and are subsequently promoted to Primary Preferred NUMA Node Sets.

Continuing with Step 1434, the NUMA I/O Framework (1410) applies the Node Selection Requirements to the Secondary Preferred Nodes. The NUMA I/O Framework (1410) determines that neither Node A (1400A) nor Node B (1400B) is the node on which the process corresponding to the Proc Object is located. However, both Node A (1400A) and Node B (1400B) are adjacent to the node on which the process corresponding to the Proc Object is located. Therefore, both Node A (1400A) and Node B (1400B) are determined to satisfy the Node Selection Requirements. Further, assume that the selection policy dictates that the node with the highest current I/O load capacity is selected. The NUMA I/O Framework (1410) applies the selection policy to the Primary Preferred Node Sets, and selects Node B (1400B).

In Step 1436, the NUMA I/O Framework (1410) binds the I/O Objects to Node B (1400B), and notifies the Kernel Scheduler (1414) of the binding. In Step 1438, the Kernel Scheduler (1414) directs instructions associated with the I/O Objects to be processed on Node B (1400B).

FIG. 14C shows an timeline of an exemplary interaction between the elements in FIG. 14A. Specifically, the timeline in FIG. 14C depicts a NUMA I/O Framework rebalancing the I/O load on the system depicted in FIG. 14A.

In Step 1460, the NUMA I/O Framework (1410) queries the Load Balancing Module (1412) to obtain the current effective I/O load of each I/O Object in the I/O Object Group. In Step 1462, the Load Balancing Module (1412) responds with the current effective I/O load of each I/O Object in the I/O Object Group. In Step 1464, the NUMA I/O Framework (1410) recalculates the I/O Object Group Aggregate Load from the current effective I/O load of each I/O Object in the I/O Object Group. Suppose in the given example, that the connection opened using the steps in FIG. 14B begins transferring data at a higher rate such that the effective I/O load of each I/O Object in the I/O Object Group has increased two fold. Therefore, the NUMA I/O Framework (1410) must recalculate the I/O Object Group Aggregate Load. Suppose the recalculated I/O Object Group Aggregate Load is calculated as the value X.

In Step 1466, the NUMA I/O Framework (1410) obtains the previously determined Node Selection Requirements. In Step 1468, the NUMA I/O Framework (1410) queries the Load Balancing Module (1412) to obtain a list of nodes with an I/O load capacity at least equivalent to the recalculated I/O Object Group Aggregate Load, X. For the purposes of this example, assume that the Load Balancing Module (1412) responds with a list detailing that Node A (1400A) has a current I/O load capacity of X+1, Node C (1400C) has a current I/O load capacity of X+3, Node D (1400D) has a current I/O load capacity of X+4. The NUMA I/O Framework (1410) also queries the Load Balancing Module to obtain the current I/O load capacity of Node B (1400B), which has a current I/O load capacity of 2. The NUMA I/O Framework (1410) calculates the I/O load capacity of Node B (1400B) as the current I/O load capacity minus the current I/O Object Group Aggregate Load, X. The NUMA I/O Framework (1410) then adds Node B (1400B) to the list of nodes with the requite I/O load capacity, and specifies the current I/O load capacity of Node B (1400B) as X+2.

In Step 1470, the NUMA I/O Framework (1410) queries the I/O Topology Module (1416) to determine the node or nodes closest to NIC (1406). In Step 1472, the I/O Topology Module (1416) responds that Node C (1400C) and Node D (1400D) are directly connected to I/O Device Group C (1404C) and NIC (1406).

For the purposes of the example, assume that the NUMA I/O Framework determines the Primary Preferred NUMA Nodes as the nodes closest to the I/O Device that have the requisite I/O load capacity. In making the determination, the Therefore, Node D (1400D) is the only Primary Preferred Node, because no other Node has an I/O load capacity of X+4.

In Step 1474, The NUMA I/O Framework (1410) determines that the current node to which the I/O Object Group is bound (Node B (1400B)) is not among the Primary Preferred NUMA Nodes. The NUMA I/O Framework (1410) then applies the Node Selection Requirements to the Primary Preferred Node. The NUMA I/O Framework (1410) determines that Node D (1400D) may not be selected because of the constraints on the I/O Object Group. Therefore, the NUMA I/O Framework (1410) determines that no Primary Preferred NUMA Node Sets are available.

In Step 1476, the NUMA I/O Framework (1410) determines the Secondary Preferred NUMA Node Sets. For the purposes of the example, assume that the Secondary Preferred NUMA Node Sets are determined from the nodes closest to the I/O Device that have the second-highest I/O load capacity. Alternatively, the Secondary Preferred NUMA Node Sets may be determined from the nodes closest to the I/O Device regardless of any I/O load capacity above the requisite I/O load capacity.

In Step 1478, the NUMA I/O Framework (1410) queries the I/O Topology Module (1416) to obtain a list of the nodes closest to the I/O Device, removing Node D (1400D) from the list. In Step 1480, the I/O Topology Module (1416) responds that Node C (1400C) is directly connected to I/O Device Group C (1404C) and NIC (1406). Node C (1400C) is therefore determined to be the Secondary Preferred NUMA Node Set, and is promoted to Primary Preferred Node Set. Alternatively, if the I/O Topology Module (1416) responded with a list of nodes already dismissed, then the NUMA I/O Framework would query the Locality Group Module to determine the set of nodes closest to the dismissed nodes.

In Step 1482, the NUMA I/O Framework (1410) determines that the current node to which the I/O Object Group is bound (Node B (1400B)) is not among the Primary Preferred NUMA Nodes. In Step 1484, the NUMA I/O Framework (1410) applies the Node Selection Requirements to the Primary Preferred Node Set. In Step 1486, the NUMA I/O Framework (1410) determines that one Primary Preferred Node Set (Node C (1400C)) is available. In Step 1488, the NUMA I/O Framework (1410) binds the I/O Objects to Node C (1400C), and notifies the Kernel Scheduler (1414) of the binding. In Step 1490, the NUMA I/O Framework (1410) determines that the process corresponding to the Proc Object should also be reassigned, and notifies the Kernel Scheduler (1414). For the purposes of the example, assume that the determination is in accordance with a process reassignment policy that dictates the process should be moved if a majority of the I/O Objects in the I/O Object Group have been reassigned to a NUMA node that is not the NUMA node upon which the process is currently executing. In Step 1492, the Kernel Scheduler (1414) directs instructions associated with the I/O Objects to be processed on Node C (1400C).

Embodiments of the invention may be implemented on virtually any type of computer implementing a NUMA architecture (1500) (or equivalent). For example, a networked computer system including two or more processors (1502), associated memory (1504), a storage device (1506), two or more I/O devices (not shown) and numerous other elements and functionalities typical of today's computers. The networked computer may also include input means, such as a keyboard (1508) and a mouse (1510), and output means, such as a monitor (1512). The networked computer system is connected to a local area network (LAN) or a wide area network via a network interface connection. Those skilled in the art will appreciate that these input and output means may take other forms. Further, those skilled in the art will appreciate that one or more elements of the aforementioned computer may be remotely located and connected to the other elements over a network. Further, software instructions to perform embodiments of the invention may be stored on a non-transitory computer readable storage medium such as a compact disc (CD), a diskette, a tape, a physical disk, or any other non-transitory computer readable storage medium.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising software instructions, which when executed by a processor perform a method, the method comprising:
   receiving, by an I/O (input output) Subsystem, a request to use an I/O device from a process;
   determining, by the I/O Subsystem, a resource to service the request;
   generating, by the I/O Subsystem, a first I/O object corresponding to the resource, wherein the first I/O object is unbound;
   generating, by the I/O Subsystem, a proc object, wherein the proc object comprises a reference to the process requesting to use the I/O device, and wherein the proc object is a software construct used by the I/O Subsystem and a Non-Uniform Memory Access (NUMA) I/O Framework to maintain location information corresponding to the process;
   sending, by the I/O Subsystem, the first I/O object and the proc object to the NUMA I/O Framework, wherein the first I/O object comprises a first affinity between the first I/O object and the proc object and wherein the first affinity is a scalar value;
   determining, by the NUMA I/O Framework using the proc object, that the process is executing on a first NUMA node of a plurality of NUMA nodes;
   selecting, by the NUMA I/O Framework, the first NUMA node based on the determination that the process is executing on the first NUMA node;
   binding, by the NUMA I/O Framework based on the selecting, the first I/O object to the first NUMA node; and
   servicing the request by processing, on the first NUMA node, the resource corresponding to the first I/O object.

2. The non-transitory computer readable medium of claim 1, wherein selecting the first NUMA node based on the determination comprises:
   obtaining, by the NUMA I/O Framework, an I/O object effective load from the first I/O object;
   obtaining, by the NUMA I/O Framework, an I/O load capacity of the first NUMA node of the plurality of NUMA nodes; and
   determining, by the NUMA I/O Framework, that the I/O load capacity is greater than the I/O object effective load.

3. The non-transitory computer readable medium of claim 1, wherein the method further comprises:
   selecting, by the NUMA I/O Framework, a second NUMA node of the plurality of NUMA nodes based on a determination that a relationship between the first NUMA node and the second NUMA node satisfies the first affinity;
   binding, by the NUMA I/O Framework based on the selecting the second NUMA node, the first I/O object to the second NUMA node;
   servicing the request by processing, on the second NUMA node, the resource corresponding to the first I/O object.

4. The non-transitory computer readable medium of claim 3, wherein selecting the second NUMA node comprises:
   obtaining, by the NUMA I/O Framework, an I/O object effective load from the first I/O object;
   obtaining, by the NUMA I/O Framework, an I/O load capacity of the second NUMA node; and
   determining, by the NUMA I/O Framework, that the I/O load capacity is greater than the I/O object effective load.

5. The non-transitory computer readable medium of claim 1, wherein the proc object and the first I/O object are in an I/O object group.

6. The non-transitory computer readable medium of claim 5, wherein the I/O object group comprises a second I/O object comprising a second affinity between the second I/O object and the proc object.

7. A system, comprising:
   a plurality of Non-Uniform Memory Access (NUMA) nodes comprising:
      a first NUMA node comprising a first processor and a first memory;
   an input/output (I/O) device group comprising an I/O device;
   an I/O Subsystem executing on at least one of the plurality of NUMA nodes, configured to:
      receive a request to use the I/O device from a process executing on the first NUMA node;
      generate a proc object comprising a reference to the process requesting to use the I/O device, wherein the proc object is a software construct used by the I/O Subsystem and a Non-Uniform Memory Access (NUMA) I/O Framework to maintain location information corresponding to the process;
      determine a first resource necessary to service the request; and generate a first I/O object corresponding to the first resource wherein the first I/O object is unbound, wherein the first I/O object comprises a first affinity between the first I/O object and the proc object and wherein the first affinity is a scalar value; and the NUMA I/O Framework executing on at least one of the plurality of NUMA nodes, configured to:
receive the first I/O object from the I/O Subsystem;
receive the proc object from the I/O Subsystem;
determine, using the proc object, that the process is executing on the first NUMA node;
select the first NUMA node based on the determination that the process is executing on the first NUMA node; and
bind the first I/O object to the first NUMA node, wherein the request is serviced by processing, on the first NUMA node, the first resource corresponding to the first I/O object.

8. The system of claim 7,
wherein the plurality of NUMA nodes further comprises:
a second NUMA node comprising a second processor and a second memory; and
wherein the NUMA I/O Framework is further configured to:
receive the first affinity;
select the second NUMA node based on a determination that a relationship between the first NUMA node and the second NUMA node satisfies the first affinity; and
bind the first I/O object to the second NUMA node based on the selecting the second NUMA node.

9. The system of claim 7,
wherein the plurality of NUMA nodes further comprises:
a second NUMA node comprising a second processor and a second memory;
wherein the I/O Subsystem is further configured to:
determine a second resource necessary to service the request;
generate a second I/O object corresponding to the second resource wherein the second I/O object is unbound; and
send, to the NUMA I/O Framework, a second affinity between the second I/O object and the proc object; and
wherein the NUMA I/O Framework is further configured to:
receive the second I/O object from the I/O Subsystem;
receive the second affinity from the I/O Subsystem;
select the second NUMA node based on a determination that a relationship between the first NUMA node and the second NUMA node satisfies the second affinity; and
bind the second I/O object to the second NUMA node based on the selecting the second NUMA node.

10. The system of claim 9, wherein the second affinity indicates a preferred relationship between the first NUMA node and the second NUMA node.

11. The system of claim 7, wherein selecting the first NUMA node based on the determination comprises:
obtaining an I/O object effective load from the first I/O object;
obtaining an I/O load capacity of the first NUMA node; and
determining, by the NUMA I/O Framework, that the I/O load capacity is greater than the I/O object effective load.

12. The system of claim 7, wherein the proc object and the first I/O object are in an I/O object group.

13. A method for binding input/output (I/O) objects to nodes, the method comprising:

receiving, by a network stack, a request to create a connection to an I/O device from a process;
determining, by the network stack, a thread to service the request;
generating, by the network stack, a first I/O object corresponding to the thread, wherein the first I/O object is unbound, and wherein the proc object is a software construct used by the network stack and a Non-Uniform Memor Access (NUMA) I/O Framework to maintain location information corres onding to the process;
generating, by the network stack, a proc object, wherein the proc object comprises a reference to the process sending the request to create the connection;
sending, by the network stack, the first I/O object and the proc object to the NUMA I/O Framework, wherein the first I/O object comprises a first affinity between the first I/O object and the pros object and wherein the first affinity is a scalar value;
determining, by the NUMA I/O Framework using the proc object, that the process is executing on a first NUMA node of a plurality of NUMA nodes;
selecting, by the NUMA I/O Framework, the first NUMA node based on the determination that the process is executing on the first NUMA node;
binding, by the NUMA I/O Framework based on the selecting, the first I/O object to the first NUMA node; and
servicing the connection by executing, on the first NUMA node, the thread corresponding to the first I/O object.

14. The method claim 13, wherein selecting the first NUMA node based on the determination comprises:
obtaining, by the NUMA I/O Framework, an I/O object effective load from the first I/O object;
obtaining, by the NUMA I/O Framework, an I/O load capacity of the first NUMA node; and
determining, by the NUMA I/O Framework, that the I/O load capacity is greater than the I/O object effective load.

15. The method claim 13, further comprising:
determining, by the NUMA I/O Framework, that the first NUMA node is not available;
selecting, by the NUMA I/O Framework, a second NUMA node of the plurality of NUMA nodes based on a determination that a relationship between the first NUMA node and the second NUMA node satisfies the first affinity;
binding, by the NUMA I/O Framework based on the selecting, the first I/O object to the second NUMA node; and
servicing the connection by executing, on the second NUMA node, the thread corresponding to the first I/O object.

16. The method claim 15, wherein determining, that the first NUMA node is not available comprises:
obtaining, by the NUMA I/O Framework, an I/O object effective load from the first I/O object;
obtaining, by the NUMA I/O Framework, an I/O load capacity of the first NUMA node; and
determining, by the NUMA I/O Framework, that the I/O object effective load is greater than the I/O load capacity.

17. The method claim 13, wherein the first I/O object and the proc object are in an I/O object group, wherein the I/O object group comprises a second I/O object comprising a second affinity between the second I/O object and the proc object.

18. The method of claim 17, wherein the second I/O object further comprises a third affinity between the second I/O object and the first I/O object.

19. The system of claim 12, wherein a second I/O object is also in the I/O object group, and wherein the second object comprises a second affinity between the second I/O object and the first I/O object.

20. The non-transitory computer readable medium of claim 6, wherein the second I/O object further comprises a third affinity between the second I/O object and the first I/O object.

* * * * *